(12) United States Patent
Besson

(10) Patent No.: US 7,516,218 B2
(45) Date of Patent: Apr. 7, 2009

(54) NETWORK-BASED INFORMATION MANAGEMENT

(75) Inventor: Frederic Besson, Thalwil (CH)

(73) Assignee: UBS AG, Zurich (CH)

( * ) Notice: Subject to any disclaimer, the term of this patent is extended or adjusted under 35 U.S.C. 154(b) by 848 days.

(21) Appl. No.: 10/334,980

(22) Filed: Jan. 2, 2003

(65) Prior Publication Data

US 2004/0044763 A1 Mar. 4, 2004

(30) Foreign Application Priority Data

Aug. 30, 2002 (EP) .................................. 02019451

(51) Int. Cl.
*G06F 15/173* (2006.01)
(52) U.S. Cl. ...................................... 709/225; 709/223
(58) Field of Classification Search .................. 709/225, 709/229
See application file for complete search history.

(56) References Cited

U.S. PATENT DOCUMENTS

| | | | | |
|---|---|---|---|---|
| 5,706,452 | A | 1/1998 | Ivanov | 395/331 |
| 5,822,518 | A * | 10/1998 | Ooki et al. | 726/6 |
| 6,078,924 | A | 6/2000 | Ainsbury et al. | 707/101 |
| 6,292,904 | B1 * | 9/2001 | Broomhall et al. | 714/1 |
| 6,341,286 | B1 | 1/2002 | Kawano | 707/101 |
| 6,434,607 | B1 * | 8/2002 | Haverstock et al. | 709/217 |
| 7,054,892 | B1 * | 5/2006 | Phillips et al. | 707/204 |
| 2004/0024620 | A1 * | 2/2004 | Robertson et al. | 705/4 |
| 2005/0192963 | A1 * | 9/2005 | Tschiegg et al. | 707/9 |

FOREIGN PATENT DOCUMENTS

| | | |
|---|---|---|
| WO | WO 02/19229 | 3/2002 |
| WO | WO 02/19245 | 3/2002 |
| WO | WO 02 46870 A | 6/2002 |
| WO | WO 02/46870 A2 | 6/2002 |

* cited by examiner

*Primary Examiner*—John Follansbee
*Assistant Examiner*—Alan S Chou
(74) *Attorney, Agent, or Firm*—Michael Bednarek; Paul, Hastings, Janofsky & Walker LLP

(57) ABSTRACT

The invention relates to a network component comprising one, two or more server units 12, 14. Each server unit 12, 14 serves a group of distributed network components CC. The network component comprises a hosting unit for hosting for a specific group of network components a plurality of program code portions including a program code portion for generating a graphical user interface having a control element for creating or updating electronic dossiers. The network component additionally comprises a database 20, 22 for storing a plurality of electronic dossiers for a specific group of distributed network components and a report generation processor having access to the database 20, 22. The report generation processors is configured to automatically generate an electronic report by processing standardized data included in the plurality of electronic dossiers.

16 Claims, 20 Drawing Sheets

Fig. 7

| General | Specific | Background | Financials | Risk | Dates | Access | | Litigation - 00024476-2002-2 |
|---|---|---|---|---|---|---|---|---|

Pretrial*: ○ No ○ Yes
Involved as*: ● Defendant ○ Plaintiff ○ Witness ○ Others
Settlement Talk*: ● No ○ Yes
Type of Proceeding*: | Administrative ▼ |
Process Object:
Approved/Informed*: ● No ○ Yes
Insurance Claim: ● No ○ Yes ○ Don't know    Access to G/M not granted Incident: | <select> ▼ |
Claim Profile*: | Liquidated/Specific Claim ▼ |
Punitive Damages: ○ No ○ Yes Type of Loss: | <select> ▼ |  ▼
Place of Loss: | <select> ▼ | ▼
Claimant Type: | <select> ▼ |  ▼ // -
Location of Incident: 📄 | <select> ▼ |
Applicable Law: | <select> ▼ |
Place of Proceeding: | <select> ▼ |

81 ↗ (pointing to Background tab)
80 ↙

Fig. 8

| General | Specific | Background | Financials | Risk | Dates | Access |

Litigation - 00024476-2002-2 ← 84

86 → Financials tab
94 → Risk tab

Currency*: USD          USD
Initial Value:
Current Value*: 10000   CHF        10000
Value in Settlement:    14861
Expected Cost*: 50000   74305      50000
Provision Conseq. Risk:
Provision Legal Fees:           } 88
Provision Primary Risk:
Initial Expected Legal Fees:
Aggregated Legal Fees:
Aggregated Court Fees:
Current Exp. Legal Fees:
%-Paid Legal Fees:
Show Invoice Files Acc-No:          Booking Unit:
                                    [ ] [ ] [ ]      [ ] [ ] [ ]
                                         } 90

Closing Payments:
Damages(*): 500       % Allocation
Recovery:             [100]
Fine:

Cost Center's:              Cost Center   Cost Center Name        GL Company    GL Company Name
Cost Center 1:                  GDUL          GROUP LEGAL      500
Cost Center 2:                                SERVICES         743
Cost Center 3:
Cost Center 4:

Fig. 10

| General | Specific | Background | Financials | Risk | Dates | Access |

Risk Type*: Compliance

Risk Classification*: ⊙ Low ○ Medium ○ High

Reputational Risk*: ⊙ Low ○ Medium ○ High ○ No reputational risk

PR Risk: \<select\>

Other Risk:
☐ None
☐ Risk of damaging precedent
☐ May attract regulatory attention
☐ Symptom of control failure
☐ Other Country of Exposure:

Group Risk Report: \<select\>

Insurance Assessment: Too early

⟵ 92

94 ⟶

96 (brace covering form fields)

Fig. 11

| General | Specific | Background | Financials | Risk | Dates | (Claims...) | Insurance Details | Access |

Current

Internal Background

New

History

Internal Background:

| 12 Aug 2002 by | : Third Entry |
| 11 Aug 2002 by | : Second Entry |
| 10 Aug 2002 by | : First Entry |

103

GIM Responsible:

Total 3rd Parties Cost:          Latest CROALD Assessment:

Tot. Exp. Recov. 3rd Parties:      Latest CROALD Cost Assessment:

Tot. Act. Recov. 3rd Parties:        Total Settlement Award:

Tot. Other Recovery:                  Total GIM Costs:

Main Policy Information    Second Policy Information    Third Policy Information

Policy: [select]

Insurers: (Display)
Policy Type: (Display)
Policy Layer: (Display)
Policy Inception: (Display)
Policy Expiry: (Display)
Policy Currency: (Display)
Limit of Policy: (Display)

Insurer/Broker Ref.:
Layer: (Display)
Insurers Notified:
Brokers Notified:
IF Notified:
Date Ins. Consent f. Ext. Advisors:
Date Closed:

Total Amount Claimed:
Total Deductible Amount:
Total Amount Agreed:
Total Amount Paid:

Total Amount o/s:
Ins. Recovery Received:

Insurance Assessment: ○ Low  ○ Medium  ○ High  ○ Too early
Present Position:

NETWORK-BASED INFORMATION MANAGEMENT

FIELD OF THE INVENTION

The present invention relates to a network-based data processing approach. More particularly, the invention relates to the control and configuration of network components that co-operate to generate and process accumulated data.

BACKGROUND OF THE INVENTION

Modern communications networks like the public Internet, non-public intranets or combinations thereof have greatly facilitated the exchange of information over both shorter and longer distances. The facilitated information exchange, however, necessitates an improved information management to cope with issues like lack of accessibility of information, sub-optimal speed of information retrieval, unnecessary duplication of processes and information, etc. It is obvious that due to the steadily increasing amount of information to be managed, the task of information management becomes increasingly laborious.

To facilitate the task of information management, numerous standard platforms have been developed. As an example for such a standard platform, Lotus Domino R5 distributed by Lotus/IBM Inc. can be mentioned. Despite the availability of such standard platforms, the existence of individual needs still requires complex considerations for example regarding network technologies and topologies, regarding the programming and interconnecting of network components and regarding the distribution of specific processing tasks among the individual network components.

Information to be processed by individual network components can relate to various aspects and usually the above considerations of a network technologist are independent from the specific nature of the processed information. However, there exist situations in which the nature of the processed information does influence technical aspects of the communications network and its components. In such a case it becomes essential that the technical environment including network topology, user interfaces, etc. is adapted to the specific type of information to ensure a proper, efficient and secure operation of the communications network. In this context information relating to tasks, processes or events that are associated with some kind of risk can be mentioned.

There is a need for a technical environment which allows an improved information management. More specifically, there is a need for appropriately configured network components and a method of controlling such network components which allow a fast, efficient and secure processing of information relating to tasks, processes or events that are associated with some kind of risk.

SUMMARY OF THE INVENTION

According to a server aspect of the invention, this need is satisfied by a network component that serves at least a first group of network components and comprises a hosting unit, a database and a report generation processor. The hosting unit is configured to host for the first group of network components at least a first program code portion for generating one or more graphical user interfaces (GUIs), a first GUI having at least a first control element for creating or updating electronic dossiers, the first control element being adapted to be activated to generate a first control signal, and a second program code portion responsive to generation of the first control signal to generate a request for the input of general data for a particular matter (e.g. a particular task, process or event) to be included in an electronic dossier of the particular matter, and a third program code portion responsive to generation of the first or a second control signal to generate a request for the input of standardized risk related data for the particular matter to be included in the electronic dossier of the particular matter. The database of the network component is configured to store a plurality of electronic dossiers for the first group of network component, each electronic dossier relating to a particular matter and including the general data for the particular matter and the standardized risk related data associated with the particular matter. The report generation processor of the network component has access to the database and is configured to generate an electronic risk report by automatically processing the standardized risk related data included in the plurality of electronic dossiers stored in the database.

The invention allows an automated distributed workflow management with respect to creating, reporting and analyzing risk related data. Due to the standardized format of the risk related data, which can be enforced using specific GUIs, the workflow is accelerated. Furthermore, accessibility of the risk related data is improved and the probability of an erroneous data input is reduced.

The hosting unit, the database and the report generation processor of the network component may belong to a first server unit. In addition to the first server unit, the network component may comprise one or more further server units having a similar construction like the first server unit. In other words, the one or more further server units may each comprise a hosting unit, a database and a report generating processor as discussed above.

Preferably, each server unit serves a separate group of network components. For example, the first server unit of the network component may serve the first group of network components via a first network and a second server unit of the network component may serve a second group of the network components via a second network which is different from the first network. According to a further scenario, a group of network components is served via one and the same network by two or more server units.

If the network component comprises two or more server units, the server units may be located geographically remote from each other. In such a case the network component which includes the geographically dispersed server units constitutes a distributed system. Preferably, the first server unit is geographically co-located with the one or more further server units of the network component. In such a case the network component is physically located at one and the same place but divided into two or more separate server units. A combination of these variants is possible. According to such a combination the network component may comprise two or more co-located server units and one or more server units located remote from each other.

According to a preferred implementation of the invention, at least one communication channel is provided between the individual server units of the network component. The communication channel between two server units may be configured as a replication connection between the individual databases of the server units. The replication connection may be used to replicate the data stored in the individual databases according to a specific replication policy. The replication policy may be selective so that only specific data are replicated.

A one-way replication policy can be implemented. According to the one-way replication policy, replication only takes place in one direction. In the case of a first server unit having a first database and a second server unit having a second database, the electronic dossiers stored in the second database are for example replicated in the first database, while the electronic dossiers stored in the first database are not replicated in the second database. Such a replication policy is especially advantageous from a security point of view because it enables to more securely prevent a network component served by the second server unit from accessing electronic dossiers stored in the first database. The level of security can further be increased by physically separating the individual server units. However, in principle the server units may also be configured as software components that are separated only logically.

The one or more server units may be configured as hypertext transfer protocol (HTTP) servers. Alternative transmission protocols could be used as well. The use of HTTP has the advantage that the network components served by the one or more HTTP servers only require a conventional browser for interpreting the program code portions received from the one or more HTTP servers. The program code portions hosted by the HTTP servers may be written in the hypertext mark-up language (HTML).

According to the server aspect of the invention described above, a network component including one or more server units hosts program code portions for one or more groups of network components which are configured to execute the program code portions. According to a complementary aspect, the invention relates to the network components executing the program code portions regardless of the fact whether the program code portions to be executed have been received via a communications network or not.

The invention thus also relates to a network component having a memory, program code portions stored in the memory, a network interface and a report generating processor or access to such a processor via the network interface. The program code portions stored in the memory include at least a first program code portion for generating one or more GUIs, a first GUI including at least first control element for creating or updating electronic dossiers, the first control element being adapted to be activated to generate a first control signal, and a second program code portion responsive to generation of the first control signal to generate a request for the input of general data for a particular matter to be included in an electronic dossier of the particular matter, and a third program code portion responsive to generation of the first or a second control signal to generate a request for the input of standardized risk related data for the particular matter to be included in the electronic dossier of the particular matter. Electronic dossiers created using the program code portions are transmitted via the network interface to a central database of the network system. In this central database electronic dossiers generated by other network components are stored also. The use of a central database allows to centrally process the standardized risk related data included in the electronic dossiers by means of the report generation processor.

According to a first variant of the invention, the report generation processor belongs to the network component executing the program code portions stored in its memory. According to a further variant, the report generation processor is geographically separated from the network component executing the program code portions. In such a case the network interface of the network component executing the program code portions may be configured to enable a communication with the remote report generation processor.

In the following various aspects relating to a network component hosting program code portions and to a network component which is configured to execute externally hosted or internally stored program code portions are described.

As has become apparent from the above, each time a new electronic dossier for a specific task, process or event is created or updated, not only the input of general data characterizing the specific task, process or event is requested but additionally the input of standardized risk related data for the particular task, process or event. In other words, the risk related data are requested and input in conjunction with creating or updating electronic dossiers. Since the electronic dossiers may be stored centrally and since the risk related data comprised within an electronic dossier are input and stored in a standardized form, the risk related data of the plurality of electronic dossiers may be efficiently processed during generation of an electronic risk report.

The execution of a specific program code portion results in the generation of a request for the input of standardized risk related data. Preferably, the request for the input of risk related data is configured such that only standardized risk related data are accepted, e.g. that the user is automatically forced to select among predefined risk related data.

Generation of the request for the input of standardized risk related data may include the generation of an e.g. graphical menu for selecting predefined risk classifications. Moreover, sub-classifications (e.g. low/medium/high) further characterizing a specific risk classification may be used. Additionally or alternatively, the request for the input of standardized risk related data may include the generation of a data field for inputting standard risk related figures like the expected total cost associated with a specific risk, expected legal fees, etc.

As has initially been explained, the third program code portion for generating the request for the input of standardized risk related data is responsive to the first control signal generated by means of the first control element of the first GUI or a second control signal. The second control signal may be generated by activating a second control element which is part of the first GUI or a separate second GUI.

The first or a fourth program code portion may be programmed to generate a third GUI having a third control element for triggering the generation of the electronic risk report. The third control element may be adapted to be activated to generate a third control signal which causes the report generation processor to generate the electronic risk report. Preferably, the electronic risk report is generated according to a specific report profile.

A report profile may either be predefined and stored or hosted by a network component or individually created. In the latter case the first or a fifth program code portion may be programmed to generate a fourth GUI having a fourth control element for triggering the definition of a report format and adapted to be activated to generate a fourth control signal. A sixth program code portion responsive to generation of the fourth control signal may be provided which generates a request for the input of report format data to be processed by the report generation processor when generating the electronic risk report. The possibility of utilizing user-defined report profiles allows to generate arbitrary electronic risk reports on the basis of the risk related data included in the plurality of electronic dossiers.

Depending on the specific report profile, various types of electronic risk reports can be electronically generated. Generation of an electronic risk report may for example comprise accumulating the standardized risk related data included in the plurality of electronic dossiers. Such an accumulation can be performed in several ways. According to a first option, specific risk related figures. comprised in the accessible electronic dossiers are simply summed up. According to a further option, all risk-related data associated with specific general date are accumulated. Thus, an association between specific general data and corresponding risk related data can be established.

A seventh program code portion for generating a request for the input of liability data to be additionally included in the electronic dossier of a particular matter may be provided. Liability data represents information that has to be reported to an insurance potentially covering the risk associated with a particular matter. The liability data may at least in part be identical with the risk related data.

The report generation processor may be configured to generate an electronic liability report in the form of e.g. an electronic insurance notification by automatically processing the liability data included in the plurality of electronic dossiers. Preferably, the report generation processor is configured such that it is ensured that the electronic liability report is generated within a predetermined period of time after creation of the electronic dossier for a particular matter or after the date of occurrence of the particular matter (as e.g. specified in the general data for the particular matter).

The seventh program code portion for generating the request for the input of liability data may be responsive to generation of e.g. the first or a fifth control signal. The fifth control signal may be generated by activating a fifth control element included in the first, the second or a sixth GUI.

The individual control elements may be adapted to be activated by an input device like a keyboard, a mouse or any other pointing device, etc. For example the individual control elements may be constituted by graphical representations like buttons or links that are included in a corresponding GUI. The individual GUIs are preferably adapted to be generated on a display device of the corresponding network component.

The invention can be implemented as a method of controlling one or more network components. The method comprises storing a plurality of program code portions including at least the first to third program code portions required for creating or updating electronic dossiers. The method further comprises storing a plurality of electronic dossiers and, in response to receipt of a control signal, accessing the stored dossiers to generate an electronic risk report by automatically processing the standardized risk related data included in the electronic dossiers. Processing of the standardized risk related data preferably includes accumulating standardized risk related data included in the plurality of electronic dossiers according to a predefined report profile.

A computer program product according to the invention comprises at least one of the first to third program code portions and program code portions for causing one or more network components to perform the steps discussed above. The computer program product may be stored on a computer readable recording medium attached to or removable from one or more of the network components.

BRIEF DESCRIPTION OF THE DRAWINGS

A more complete understanding of the present invention may be obtained from consideration of the following description of various illustrative embodiments of the invention in conjunction with the drawings in which:

FIGS. 6 to 9 are schematical depictions of GUIs of the invention for inputting general data for a particular matter;

FIGS. 10 and 11 are schematical depictions of GUIs of the invention for inputting standardized risk-related data;

FIGS. 13 to 15 is a schematic depiction of GUIs of the invention for entering standardized liability data;

FIG. 19 is a schematic depiction of GUIs of the invention for inputting data relating to a risk report format.

DETAILED DESCRIPTION OF VARIOUS ILLUSTRATIVE EMBODIMENTS

In the following, the present invention will exemplarily be set forth with respect to a web-based solution erected on a network topology that supports the implementation of a secure and reliable access control mechanism. Although the present invention is particularly suited for handling risk related data, the network topology and access control mechanisms according to the invention can be implemented regardless of the nature of the data that are hosted, stored, processed, etc.

Now a first embodiment of the invention in the form of a "classical" client-server application will be described.

Figure 1:
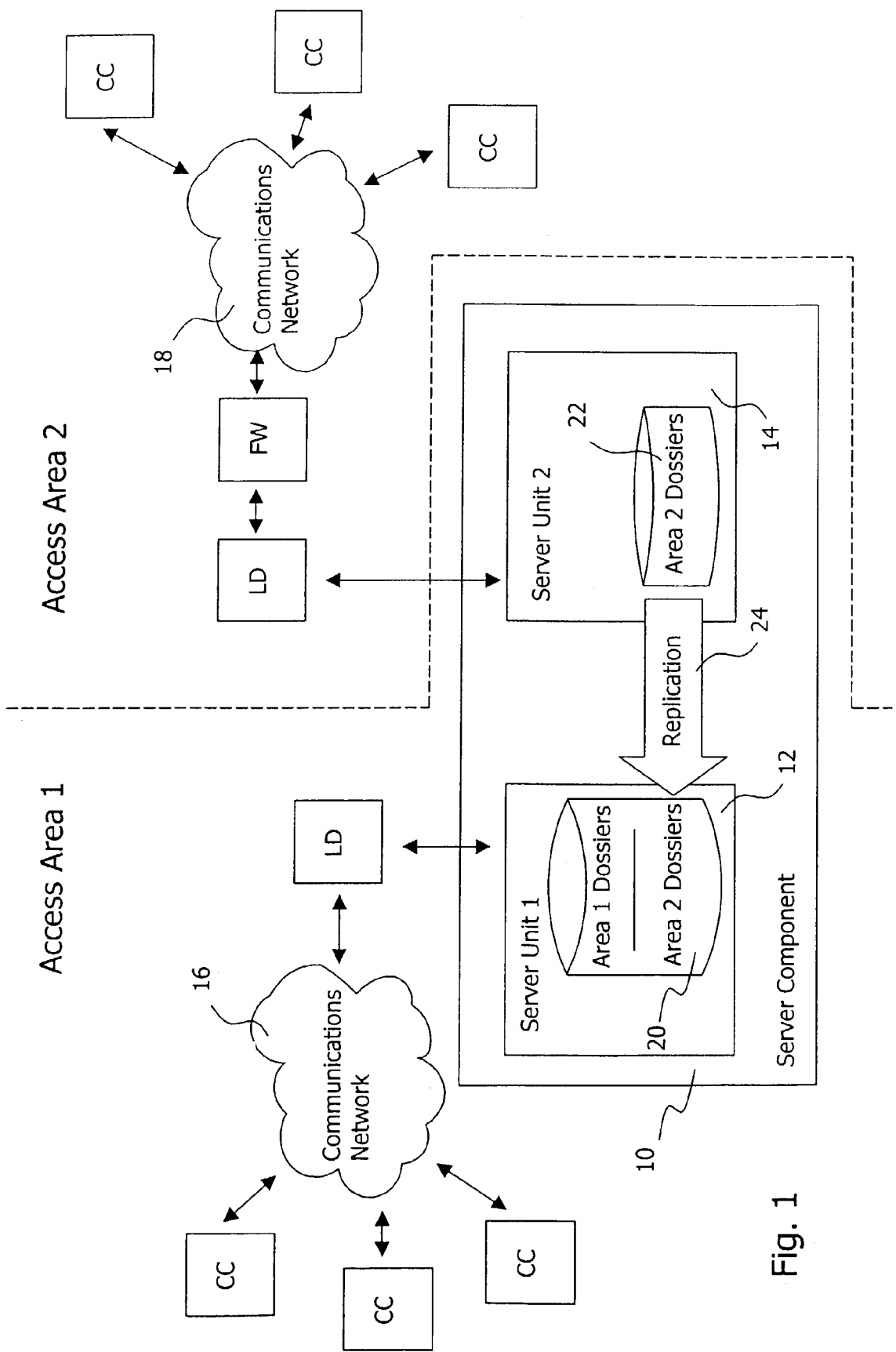
FIG. 1 is a schematic diagram of a network topology including a server component according to the invention.

FIG. 1 shows an exemplary client-server network topology according to the invention. The network topology is divided in two separate access areas that are geographically distinct from each other. The first access area may for example be a specific geographical region (city, country, etc.) and the second access area may be the rest of the world or simply a different geographical region. In principle, more than two different access areas or overlapping access areas could be defined as well.

A network component 10 with server functionalities constitutes the core of the network topology. The server component 10 is geographically located in the first access area but can be accessed from both the first access area and the second access area.

In the embodiment depicted in FIG. 1, the server component 10 comprises a first server unit 12 and a second server unit 14. Within the server component 10, the first server unit 12 and the second server unit 14 may be configured as separate software or separate hardware components. Access control is facilitated if the two server units 12, 14 are physically configured as separate hardware components.

Each of the two server units 12, 14 serves a different access area. As can be seen from FIG. 1, the first server unit 12 serves via a local directory LD and via a first communications network 16 a plurality of distributed client components CC arranged in the first access area. The first communications network 16 may be a wide area network (WAN), a local area network (LAN) or a combination thereof. In addition to its server functionality, the first server component 12 performs authentication and authorization tasks with respect to the distributed client components CCs located in the first access area.

The second server unit 14 arranged in the second access area serves a second group of distributed client components CCs located in the second access area. The second server unit 14 performs this task via a local directory LD, a firewall FW and a second communications network 18. The second communications network 18 may be a WAN, a LAN or a combination thereof. In addition to its server tasks, the second server unit 14 authenticates the distributed client components CC located in the second access area and checks their authorization.

The first communications network 16 and the second communications network 18 are arranged in separate access areas. In the embodiment depicted in FIG. 1, there is no overlap between the first communications network 16 and the second communications network 18.

Each of the first server unit 12 and the second server unit 14 comprises a separate database 20, 22. In the database 22 of the second server 14 electronic dossiers that have been created in the second access area are stored, whereas in the database 20 of the first server unit 12 electronic dossiers that have been created in either one of the first access area and the second access area are stored. In order to store in the database 20 of the first server unit 12 electronic dossiers that have been created in the second access area, the electronic dossiers stored in the database 22 of the second server unit 14 have to be duplicated. To that end a replication connection 24 is established between the database 22 of the second server unit 14 and the database 20 of the first server unit 12. The replication connection 24 may be established only temporarily or may remain established over longer periods of time.

As becomes apparent from the single-headed arrow denoting the replication connection 24, replication is performed according to a one-way replication policy. This means in the embodiment depicted in FIG. 1 that there is only a data flow from the database 22 of the second server unit 14 to the database 20 of the first server unit 12 but not data flow in the opposite direction. This one-way replication policy supports an access control according to which client components CCs located in the first access area are in principle (i.e. not taking into account individual access restrictions) authorized to access all electronic dossiers regardless of their origin, while client components CCs located in the second access area (provided that these client components CCs have appropriate individual access rights) are only authorized to access the electronic dossiers that have been created in the second access area.

It should be noted that in the databases 20, 22 of the server units 12, 14 additional data not relating to electronic dossiers may be stored also. For such additional data an additional replication connection may be established in parallel to the replication connection 24 depicted in FIG. 1. This additional replication connection may be based on a two-way replication policy that ensures that the additional data is not only transferred from the database 22 of the second server unit 14 to the database 20 of the first server unit 12 but also vice versa.

The structure of the first server unit 12 belonging to the server component 10 of FIG. 1 will now be described in more detail with reference to FIG. 2. As becomes apparent from FIG. 2, the first server unit 12 has an interface 28 for communicating via the first communications network 16 (and via a load directory not depicted in FIG. 2) with the distributed client components located in the first access area. Moreover, the first server unit 12 is via the replication connection 24 in communication with the second server unit 14 and in particular with the database 22 containing electronic dossiers that have been created in the second access area. Depending on the configuration of the first and second server units 12, 14, the replication connection 24 may be a software or a hardware solution.

In addition to the interface 28 mentioned above, the first server unit 12 comprises an access control list (ACL) controller 30 in communication with the interface 28, a hosting unit 32 in communication with the ACL controller 30, a database 20 for electronic dossiers in communication with the ACL controller 30, a report generation processor 34 in communication with both the database 20 and the ACL controller 30, and a replication unit 36.

The replication unit 36 is in communication with the database 20 of the first server unit 12 and via the replication connection 24 with the database 22 of the second server unit 14. The replication unit 36 need not necessarily be an internal unit of the first server unit 12. It could also be an internal unit of the second server unit 14 or it could be provided internally with respect to the server component 10 of FIG. 1 but externally with respect to the two server units 12, 14.

The second server unit 14 has a similar construction like the first server unit 12 and similar functionalities. Consequently, only the first server unit 12 depicted in FIG. 2 in more detail will exemplarily be discussed hereinafter.

After a client component has been authenticated by the first server unit 12, all accesses from this client components via the first communications network 16 and the interface 28 are subjected to an authorization check within the ACL controller 30. The ACL controller 30 thus prevents un-authorized accesses to any one of the database 20, the hosting unit 32 and the report generation processor 34. The specific access control policy enforced by the ACL controller 30 will be explained in more detail with reference to FIG. 3 below.

Figure 2:
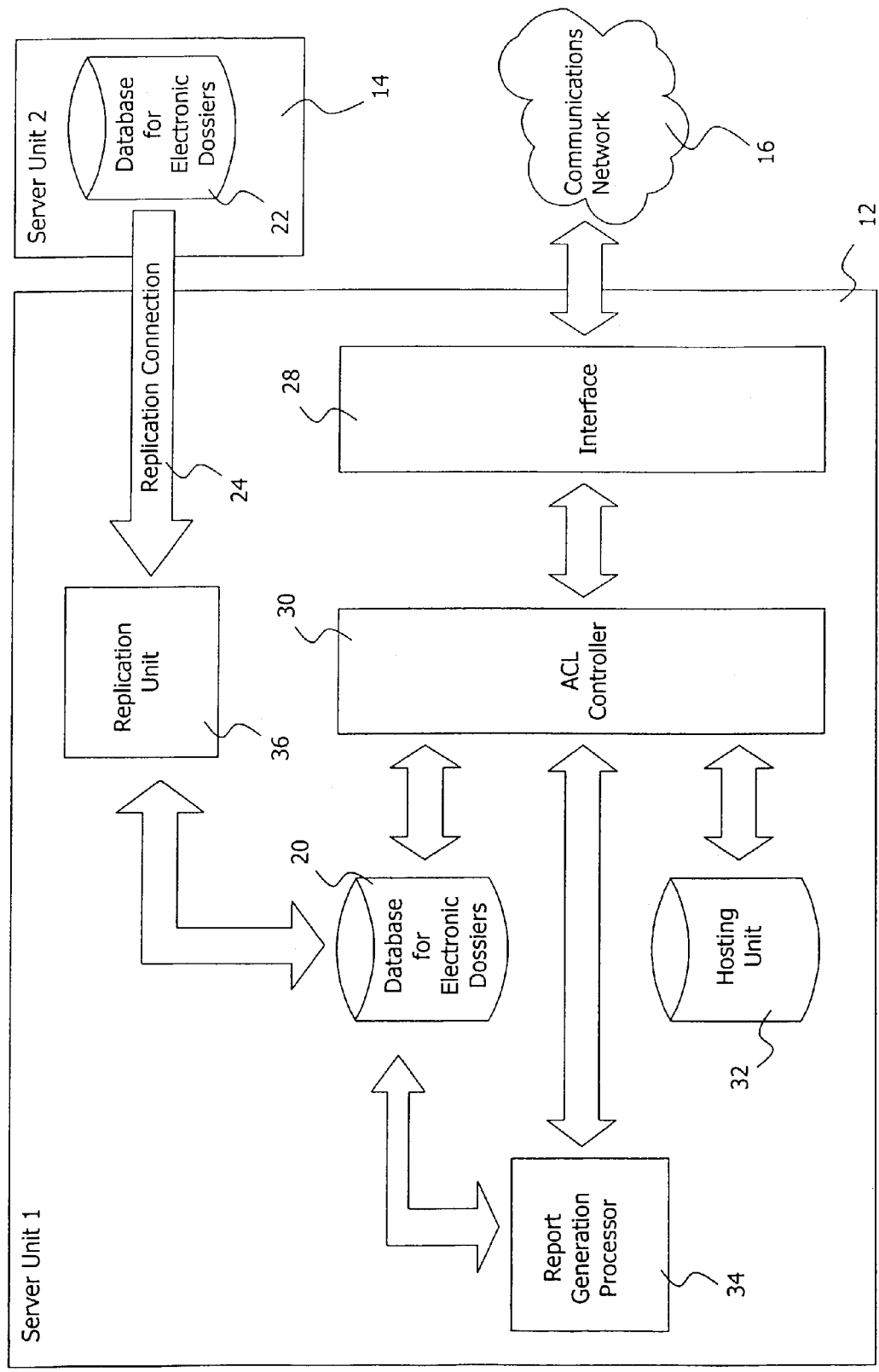
FIG. 2 is a schematic diagram illustrating a server component according to the invention in more detail.

The hosting unit 32 of the first server unit 12 depicted in FIG. 2 hosts program code for the first group of client components located in the first access area. The program code hosted by the hosting unit 32 includes program code portions for generating the GUIs and input requests that will later be discussed with reference FIGS. 6 to 11 and 13 to 20.

Any client component belonging to the first group of client components located in the first access area and having appropriate access rights may trigger the report generation processor 34 to generate an electronic risk report by automatically processing the standardized risk related data included in the electronic dossiers that are stored in the data base 20. The electronic risk report is generated according to a predefined report profile which has been provided by the client component triggering the report generation processor 34 or which has previously been stored in an internal memory of the report generation processor 34.

Details regarding the creation of a report profile and an electronic risk report will be explained in more detail with reference to FIGS. 17 to 20 below. Here it should be noted that only the report generation processor 34 of the first server unit 12 can generate a "global" risk report because only the database 20 of the first server unit 12 completely contains the electronic dossiers of both access areas. The corresponding report generation processor of the second server unit 14 can only create "local" risk reports on the basis of the electronic dossiers stored in the database 22 of the second server unit 14, i.e. on the basis of the electronic dossiers that have been created in the second access area. Such a configuration adds an additional layer of security to the access control mechanisms implemented according to the invention. This will now be described in more detail with reference to FIG. 3.

Figure 3:
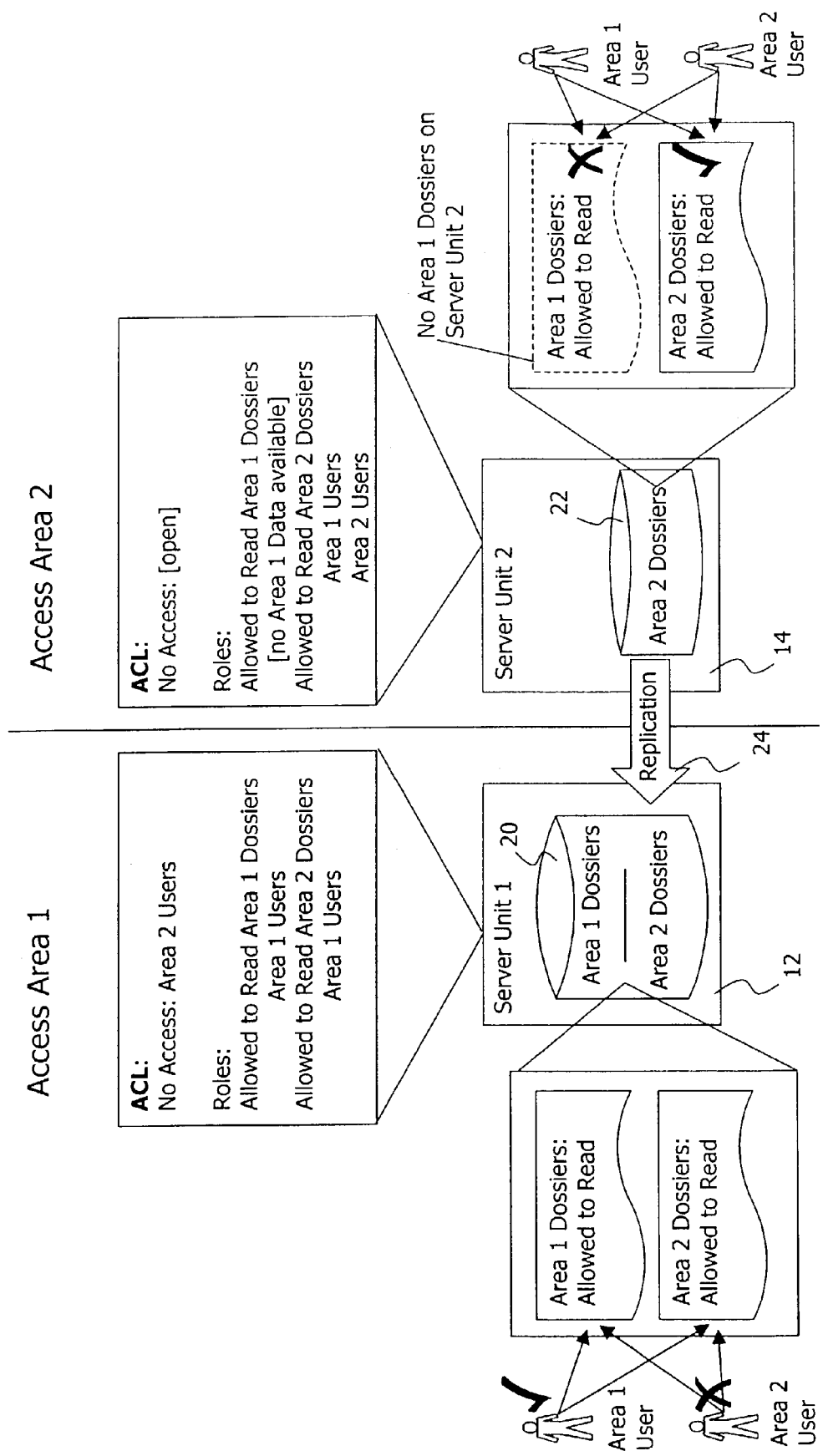
FIG. 3 is a schematic diagram illustrating an access control mechanism according to the invention.

FIG. 3 shows the access control scheme that is implemented according to the invention using two distinct server units 12, 14, appropriately configured ACL controllers in each of the server units 12, 14 and a one-way replication connection 24 for replicating the electronic dossiers managed by the server units 12, 14.

According to the access control scheme depicted in FIG. 3, the ACL enforced by the ACL controller in charge for the first access area specifies that users belonging to the second access area have no access to the electronic dossiers stored in the database 20 of the server unit 12 even if they temporarily resided in the first access area. It further specifies that users belonging to the first access area are allowed to read all electronic dossiers available in the database 20 of the first server unit 12 provided that their access rights have not individually been restricted.

Now the ACL enforced by the ACL controller of the second server unit 14 will be discussed. The ACL enforced in the second access area does not contain any restrictions. This means that in principle every user has access from the second access area to every electronic dossier stored in the database 22 of the second server unit 14 provided that appropriate individual access rights have been conferred. It should be noted, however, that electronic dossiers that have been created in the first access area are not available in the database 22 of the second server unit 14. Consequently, any user accessing the database 22 of the second server unit 14 can only read electronic dossiers that have been created in the second access area. This means that even if a user usually resident in the first access area (and thus having in principle unrestricted access rights regarding electronic dossiers created in the first access area) temporarily resided in the second access area, this user could only read the electronic dossiers that have been created in the second access area because it is not possible to access electronic dossiers created in the first access area from a client component located in the second access area.

Figure 4:
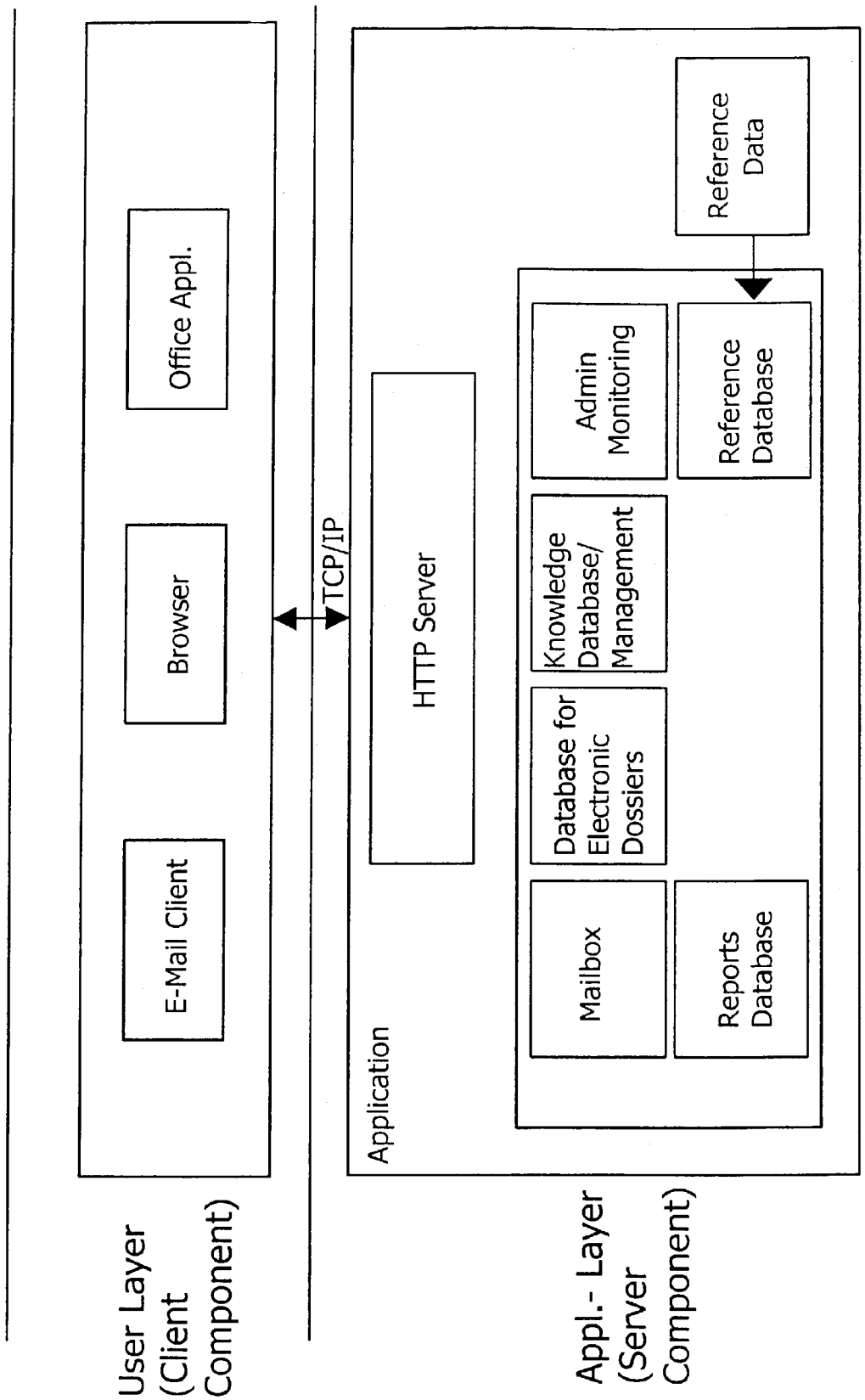
FIG. 4 is a schematic diagram depicting the individual software layers according to a preferred embodiment of the invention.

As has been mentioned above, the first embodiment of the invention is configured as a classical server-client application. FIG. 4 shows the exemplary layered software structure of such a client-server application.

The software structure depicted in FIG. 4 is basically divided in a user layer residing on the client components and an application layer residing on the server component (Lotus Notes/Domino server). The user layer comprises a web-browser as primary user interface, an email client and one or more office applications like a word processor.

The interaction between the user layer and the application layer is mainly performed in accordance with TCP/IP by an HTTP server (included in the Lotus Notes/Domino platform). The actual application comprises a plurality of individual components like a mailbox for the transfer of emails from and to the email client of the user layer. Additionally, a reports database is provided in which previously generated reports are stored in the form of HTML documents. Previously generated reports stored in the reports database can be retrieved by the user at a later point in time and can be exported for example into an office application to be processed further. The original reports stored in the report database are wright protected and cannot be changed.

Further components of the application running the server component include a database for electronic dossiers, a component for knowledge management, a reference database, an administration component and a component for managing externally provided reference data.

The first embodiment described above with reference to FIGS. 1 to 4 is based on a client-server approach. In the following, a second embodiment of the invention will be described with reference to FIG. 5. According to the second embodiment, the server component is optional because the program code to be executed by a network component in conjunction with creating or updating an electronic dossier need not necessarily be hosted by a server component but may have been loaded into a memory of this network component from an external data carrier like a CD-ROM or a DVD or from an internal data carrier like a hard disc.

Figure 5:
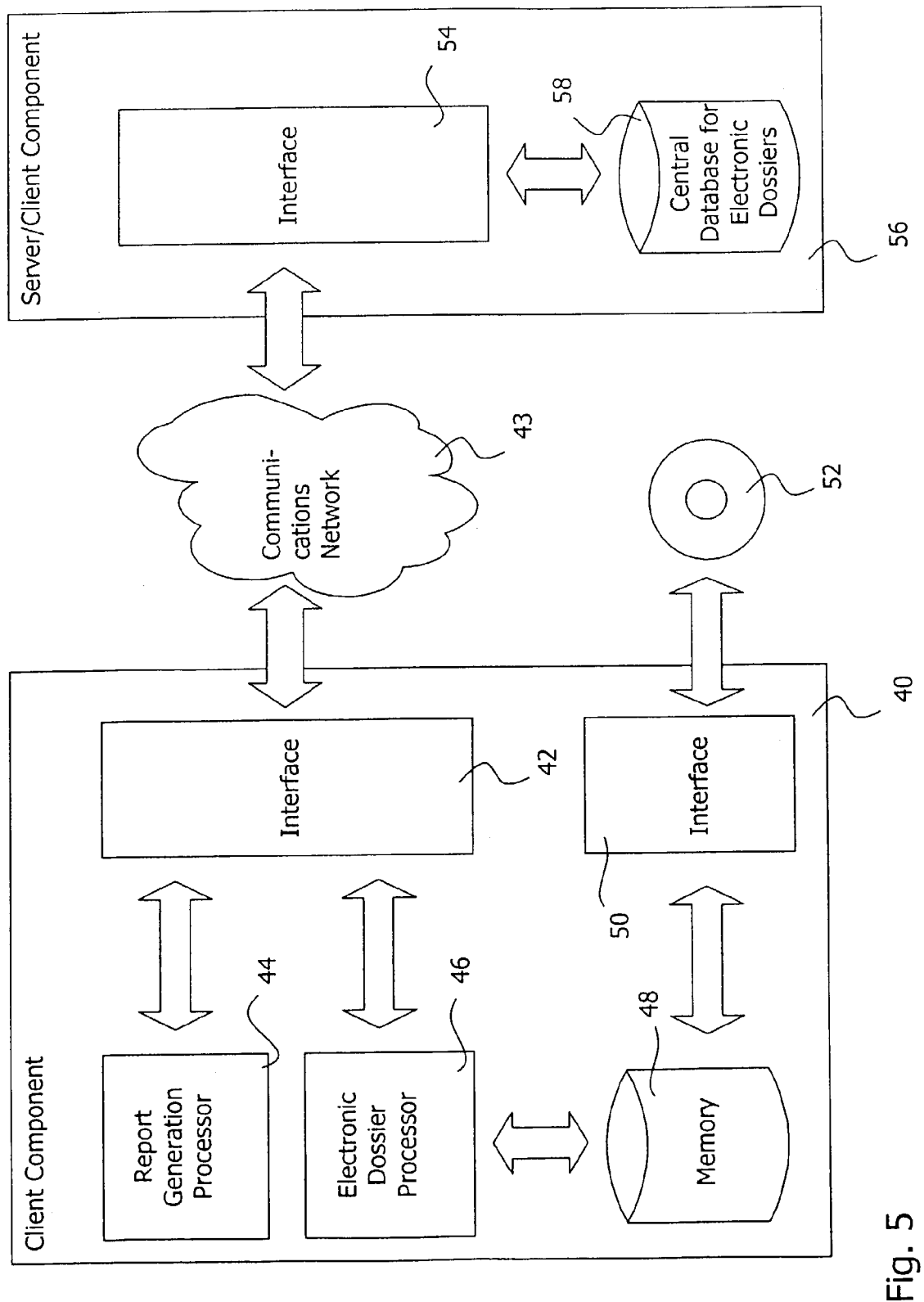
FIG. 5 is a schematic diagram illustrating a client component according to the invention.

In FIG. 5 the network components 40, 56 for implementing the second embodiment of the invention are schematically shown. A more detailed description of the network topology and a discussion of the access control scheme are omitted for the second embodiment. In principle, however, the second embodiment may be based on a network topology similar to that shown in FIG. 1 and on the access control scheme explained with reference to FIG. 3.

As becomes apparent from FIG. 5, a network component 40 according to the invention (here configured as client component) comprises an interface 42 which is arranged between a communications network 43 on the one hand and a report generation processor 44 and an electronic dossier processor 46 of the client component 40 on the other hand. The electronic dossier processor 46 of the client component 40 is arranged between the interface 42 and a program code memory 48. In the program code memory 48 the program code required to generate the GUIs and the input requests that will be explained below with reference to FIGS. 6 to 11 and 13 to 18 are stored. These program codes have been loaded into the program code memory 48 via a further interface 50 of the client component 40 from an external data carrier in the form of a CD-ROM or DVD 52.

The program code memory 48 contains a program code that controls the electronic dossier processor 46 to request data required for creating or updating an electronic dossier from a user of the client component 40. Once an electronic dossier has been created or updated, the program code controls the electronic dossier processor 46 to transmit the created or updated electronic dossier via the communications network 43 to the further network component 56. The further network component 56 may be a server component or a further client component.

The created or updated electronic dossier received from the client component 40 via the communications network 43 is received by an interface 54 of the network component 56 and stored in a central network database 58. In the database 58 electronic dossiers are stored that have been received by the network component 56 from a plurality of client components having a similar structure like the client component 40 depicted in FIG. 5.

If the client component 40 executes a program code portion that triggers the generation of a risk report, the report generation processor 44 of the client component 40 accesses the database 58 of the network component 56 to generate an electronic risk report by automatically processing the standardized risk related data included in the plurality of electronic dossiers stored in the database 58.

In the following, the data input and data processing operations performed under control of the program code portions hosted by the serving units 12, 14 depicted in FIGS. 1 and 3 and/or stored in the memory 48 of the client component 40 depicted in FIG. 5 will be described with reference to the screen prints of FIGS. 6 to 11 and 13 to 20. In the embodiment discussed hereinafter the management of electronic dossiers relating to events occurring in conjunction with typical business operations will exemplarily be explained. For such events, risk assessment and secure risk reporting are indispensable.

Every time a new electronic dossier relating to e.g. a legal event is to be created or an existing one is to be updated, the universal resource locator (URL) of the server component hosting the program code must be typed in the web browser of a client component or a corresponding link has to be activated (first embodiment depicted in FIGS. 1 to 4). In the second embodiment depicted in FIG. 5 the program code contained in the program code memory 48 of the client component 40 has to be executed.

In a next step, authentication and authorization steps are performed to verify the user's authenticity and to check whether or not the authenticated user is actually authorized to create or update an electronic dossier. Once authentication and authorization have successfully been performed, a first GUI 60 having the content depicted in FIG. 6 is displayed by the browser of the client component.

The GUI 60 has a control element in the form of a link 54 titled "Create File" (the term "file" denotes an electronic dossier) which is adapted to be activated by e.g. a mouse to generate a control signal. A program code portion responsive to generation of this control signal generates a further GUI 64 in the form of a tab titled "General".

Figure 6:
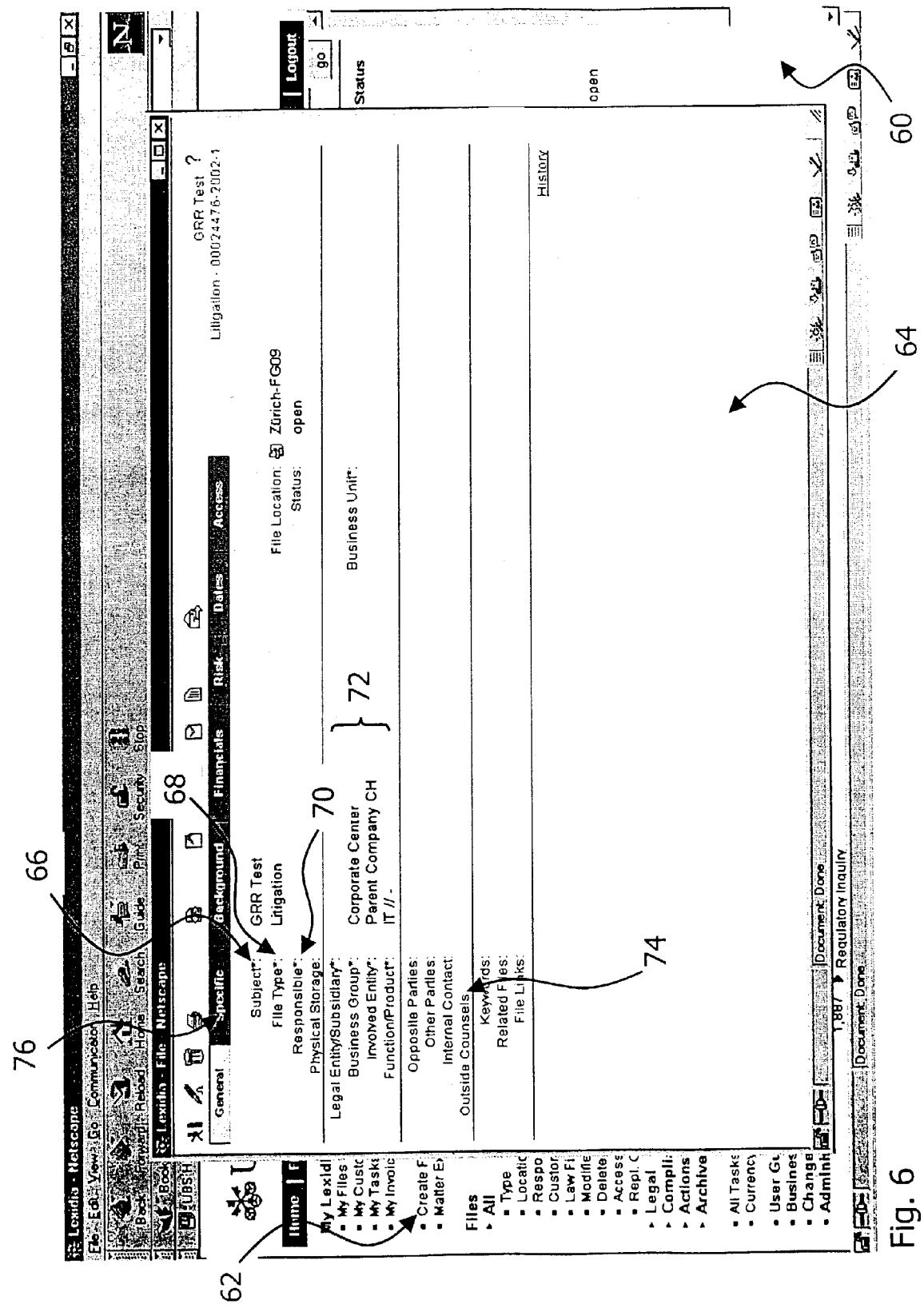

FIG. 6 shows the GUI 64 in a state after the confirmation of previously input general data. During the data input, the GUI 64 has an appearance as is shown in FIG. 7.

Figure 7:
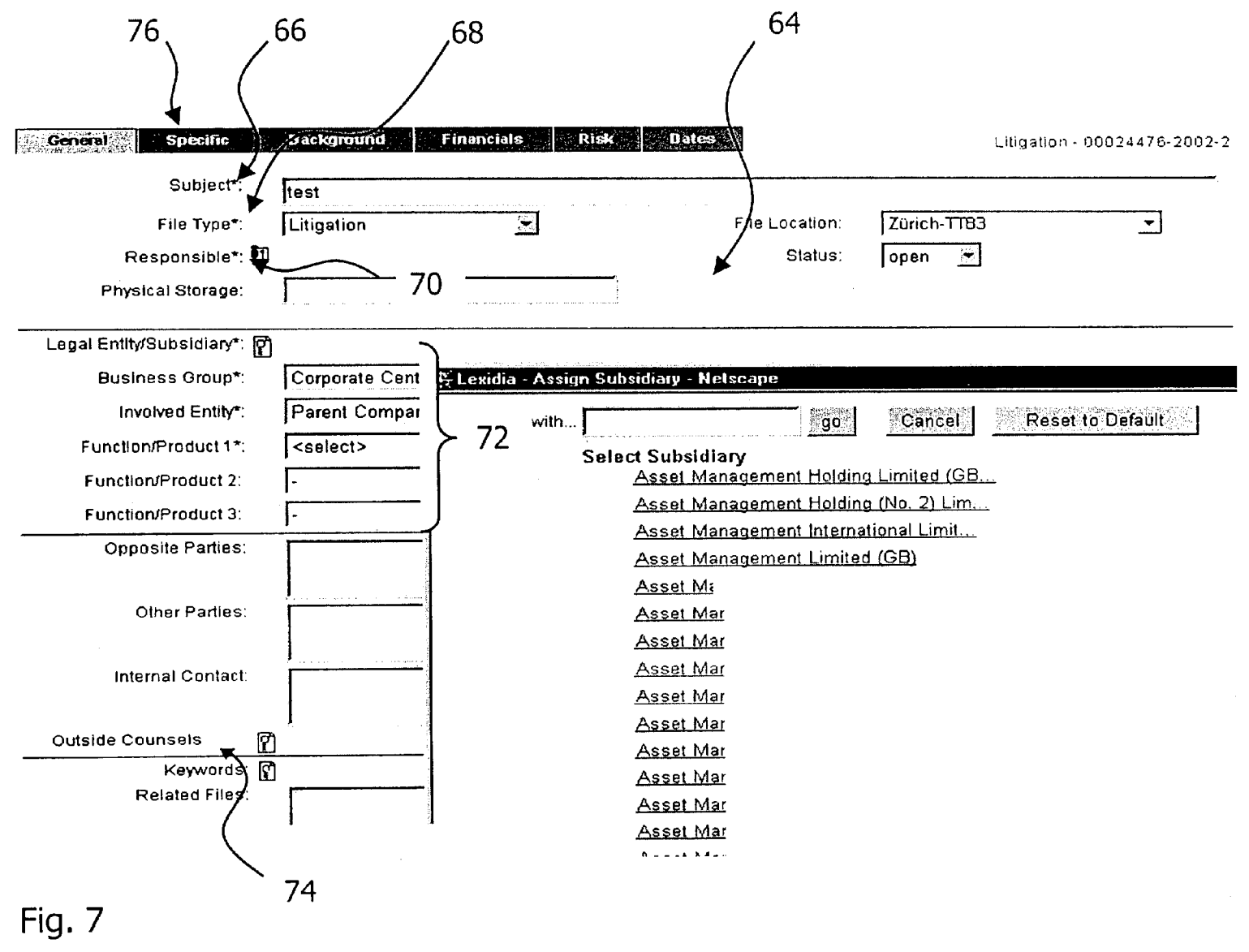

As becomes apparent from FIGS. 6 and 7, there exist six further tabs titled "Specific", "Background", "Financials", "Risk", "Dates" and "Access". The function of the further tabs will be explained below.

The GUI in the state of FIG. 7 includes requests for the input of various standardized and non-standardized general data characterizing a specific event that has occurred in a business context. The non-standardized field 66 for example requests the user to input a specific title for the electronic dossier to be created. The next data field "File Type" 68 accepts only standardized input. When activating the data field 68, a pull-down menu is opened and the user may choose among various, standardized dossier types like general matter, litigation (i.e. an official legal proceeding in which the company is involved either as the plaintiff, as the defendant as or a witness), outlook case (i.e. a case that in the future may give rise to a specific risk), legal complaint (i.e. a complaint of a client or customer which might have a legal or compliance implication), etc. Further data fields for the input of general data relating to the specific event include a data field 70 for indicating the person responsible for the handling of the event, a plurality 72 of data fields for specifying the legal entity involved in the event and a data field 74 for entering an outside counsel assisting in the handling of the event.

Figure 9:
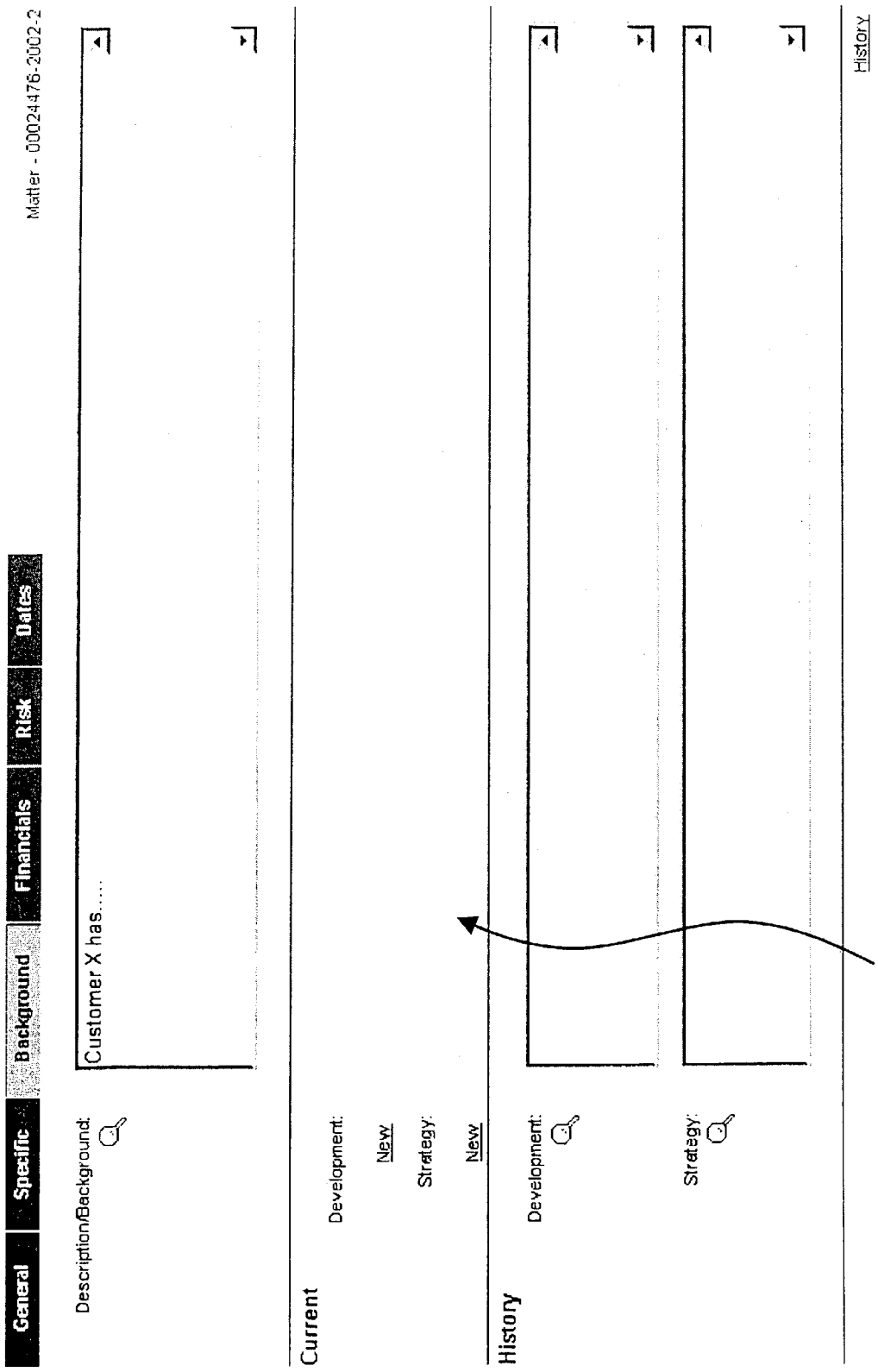

Once all applicable data fields of the GUI 64 have been filled with the appropriate standardized or non-standardized general data characterizing the particular event, further general data can be input in the tabs "Specific" and "Background". In the GUI 64 all tabs from "Specific" to "Access" constitute control elements that are adapted to be activated by clicking thereon with a mouse to generate a corresponding control signal. In response to generation of such a control signal a specific program code portion responsive to generation of the specific control signal is executed and the specific program code portion generates a corresponding GUI which allows an additional data input. For example by clicking on the tab "Specific" 76 of GUI 64 the corresponding GUI 80 depicted in FIG. 8 and by clicking on the tab "Background" the corresponding GUI 82 depicted in FIG. 9 are displayed.

Each of the GUIs 80, 82 includes a plurality of requests (data fields) for the input of general data further characterizing the event. For example GUI 80 includes a data field 81 titled "Insurance Claim" which requests the user to specify insurance related data. With respect to the request 81 the user can choose between the standard options "No", "Yes" and "Don't know". "No" gives no access to the electronic dossier to users handling insurance issues, while the other two options add such users to the access list. The access statures of the electronic dossier is shown at the right side of the date field "Insurance Claim" 81 in the form of a corresponding message. If a user handling insurance issues sets the value to "No", access to the electronic dossier will be revoked for all users handling insurance issues. Since the remaining data fields of GUIs 80, 82 have appropriate titles, a more detailed description of the input options is omitted here.

An important aspect of risk reporting is a standardized risk measurement process. The risk measurement process starts with the collecting of the "hard" figures which are connected with a specific event (e.g. litigation, outlook case, legal complaint, . . . . ).

By activating the tab titled "Financials" included in GUIs 64, 80 and 82 a control signal is generated which causes a specific program code portion responsive to generation of this control signal to generate the GUI 84 depicted in FIG. 10. The GUI 84 includes several data fields for the input of both general data and risk related data for the event. For example the data field 86 of GUI 84 is configured as a pull-down menu that allows to select the specific currency in which the general and risk related figures will subsequently be entered. The further data fields 88 allow the input of specific figures characterizing the event and the risk associated therewith.

Standard risk related figures which are input via the data fields 88 of the tab "Financials" will now exemplarily be explained. The data field "Initial Value" refers to the first amount claimed in a particular proceeding by the claimant. The data field "Current Value" denotes the most recent amount claimed by the claimant including any interests. The data field "Value in Settlement" relates to the amount the person responsible for handling the legal event considers likely to be paid or received. In a next step the expected cost has be evaluated and entered in the appropriate data field. The expected cost is the loss expected to arise in connection with the specific event. In other words the data field "Expected Cost" helps to record the expected net result arising out of e.g. a specific dispute or claim.

The person responsible for handling the specific event has to request the making of provisions corresponding to the amount of the expected cost. This provisioning process relates in particular to all types of consequential (also called "operational") risks. As a rule the amount included in the data field "Provision Legal Fees" should be the same as the amount indicated in the data field "Expected Cost". The provisions will be booked in the account which relates to the selected risk type. For example provisions for an event with a liability risk will be booked in the "Liability Provision Account". Details regarding selection of a specific risk type will be explained below with reference to FIGS. 11 and 12. If an event involves only primary risks like a credit risk or a market risk (FIG. 12), the provisioning process might directly be initiated by the business unit in which field of operation the legal event has occurred. Regardless of the risk type, information about account numbers and the "Booking Unit", which is responsible for the provisioning process, has to be entered in the appropriate data fields 90.

A further financial risk arises out of legal fees related with a particular event. Such legal fees include for example costs of outside counsels, fees for court proceedings, etc. When creating an electronic dossier for a specific event, an appropriate figure for the approximate legal fees has to be estimated and entered into the data field "Initial Expected Legal Fees". If the expected legal fees exceed a certain amount, a provision has to be made. To that end an appropriate figure is entered into the data field "Provision Legal Fees".

Whenever an invoice is registered for payment, the relevant amount has to be entered using a GUI not depicted in the drawings. This allows to automatically determine and display aggregated legal and court fees for a specific legal event.

The standardized risk measurement approach described above with reference to FIG. 10 helps to greatly facilitate automatic risk reporting and automatic provisioning. This will be described in more detail below.

By activating the control element in the form of the "Risk" tab 94 of e.g. GUI 84 depicted in FIG. 10, a control signal is generated which gives rise to a request for the input of additional risk related data. In FIG. 11 a corresponding GUI 94 is displayed. In the following, the relevant data fields 96 of this GUI 94 and the standardized options for filling out these data fields 96 will be explained in more detail.

The first data field of the plurality of data fields 96 relates to the one or more specific risk types associated with the particular event for which the electronic dossier is created. An overview of the standardized risk types that may be entered into the data field "Risk Type" is shown in FIG. 12.

Figure 12:
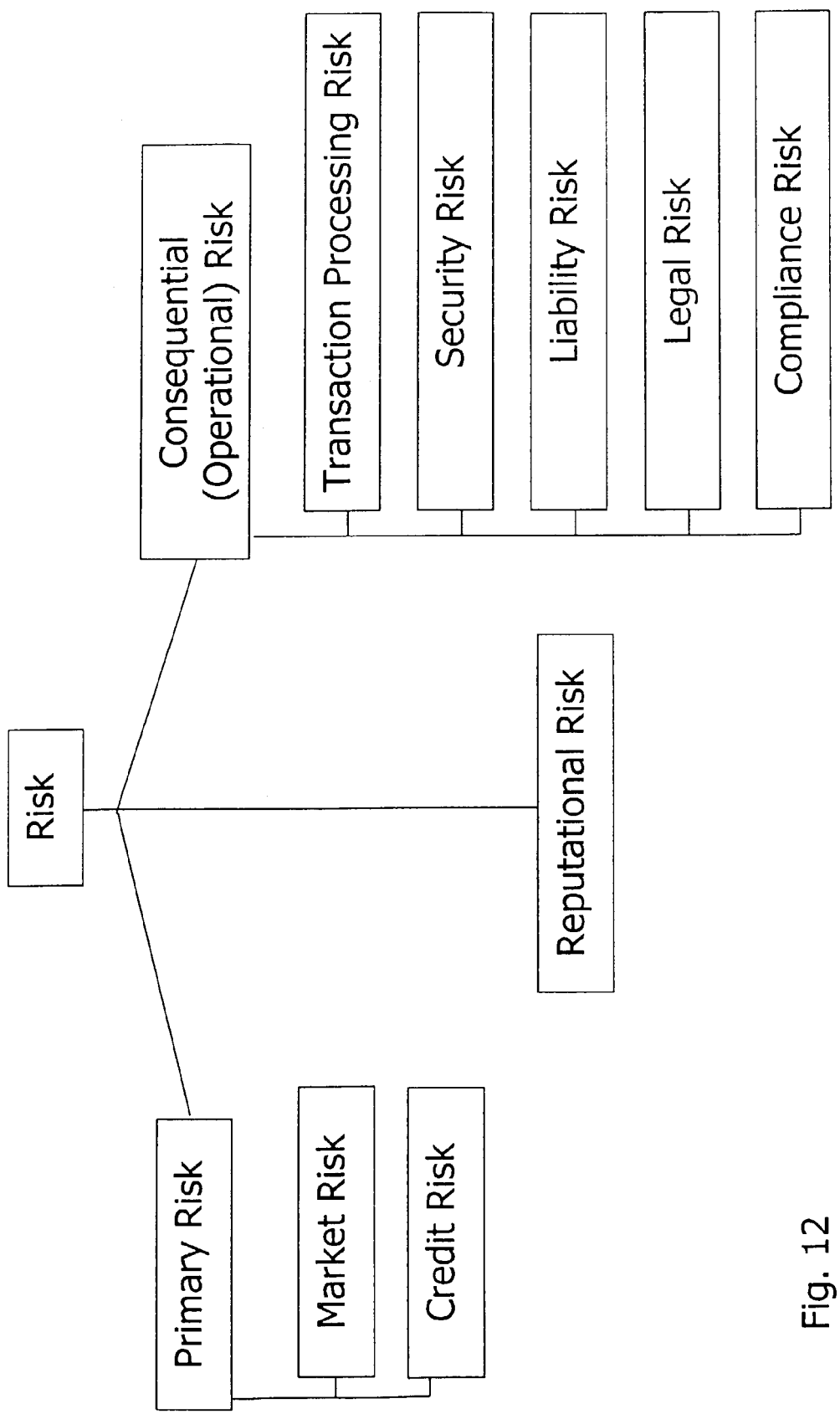
FIG. 12 is a schematic diagram illustrating an exemplary risk classification approach.
Figure 13:
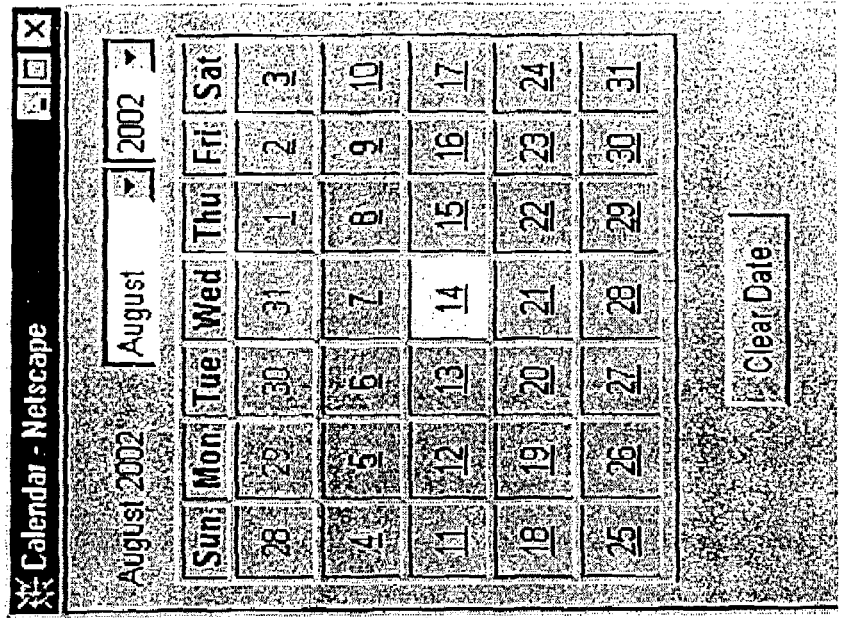

As can be gathered from FIG. 12, three different risk categories are distinguished, namely primary risk, reputational risk and consequential (or operational) risk. In the embodiment depicted in FIG. 11 the risk type "Compliance Risk" belonging to the risk category consequential risk has been entered. The risk type "Compliance Risk" relates to the risk that the company does not comply with applicable laws, internal or external regulations or restrictions and might be penalized with any form of sanctions. Other risk types include market risk (risk of losses arising from movements in market prices, including interest rates etc.), credit risk (risk that a counterpart or an issuer of a debt security will fail to perform on an obligation or that its ability to fulfill its obligation becomes questionable), reputational risk (risk of loss of business arising as a result of a failure to conduct the business activities in an appropriate manner), liability risk (risk of loss due to the co-operation being held responsible for a contractual or legal claim, dept or action), legal risk (risk of loss because contracts cannot be enforced including risks arising from inadequate documentation, insufficient capacity, etc.).

After the standardized risk type has been selected, the risk associated with the specific event has to be classified with respect to one of the predefined categories "low", "medium" and "high". A low risk means that there is an estimated probability between 0 and 25% that for example the company will lose a litigation proceeding. The corresponding percentage range attributed to a medium risk is 26 to 70% and to a high risk 71 to 100%.

If the event affects the company's reputation, the data fields "Reputational Risk" and "PR Risk" have to be filled out. In a first step it has to be selected with which intensity the reputation of the company is touched by the event. To that end one of the standardized classifications "low", "medium", "high" or "no reputational risk" has to be selected. In a second step it has to be described in which way the event will get public attention by filling out the data field "PR risk". The following standardized inputs are available: "no external effect", "no media coverage", "limited local or media coverage", "limited national coverage" and "sustained national and limited international media coverage".

The data field "Other Risk" of the plurality of data fields 96 of the GUI 94 helps to identify those legal events that have characteristics that could affect the way the company may have to conduct its operations in future. Standardized input options include for example "Risk of damaging precedent" (this option should be selected if an adverse finding arising out of the event could impact on the company's ability to access particular jurisdictions or market products), "Symptom of control failure" (the existence of a particular event may indicate significant control failure within the company) and others.

An important data field with respect to automatic risk reporting is the data field "Group Risk Report" of GUI 94. This data field allows to control aspects relating to the reporting of the specific event for which the electronic dossier is created. In particular, this data field allows to select if and in which way a particular event should be included in a "global" risk report relating to all risks associated with a specific (e.g. geographical or functional) business unit of the company or the whole company. The following standardized inputs are accepted:

Group risk report (GRR) not relevant: The event should not be included in the GRR GGR new: The event will be included for the first time in the GRR. As a rule, all legal events with an expected cost (legal risk) higher than a predefined amount or with a very high reputational risk should be included in the GRR.

GRR material developments since last report: The event has already been included in the last GRR. Since then some new developments have taken place which are worth to be mentioned in the GRR.

GRR no material development since last report: The event has already been reported in the last GRR. However, since then no material developments that are worth to be included in the GRR have occurred.

As has become apparent from the above, the GUI 94 depicted in FIG. 11 is, besides the GUI 84 depicted in FIG. 10, the main interface for inputting standardized risk related data for a particular event.

In many cases, the risks associated with an event are covered by an insurance. Consequently, it is advantageous to include insurance related data in the electronic dossier of this event. This allows to automate insurance notification and in particular to prevent late notification which can lead to denial of coverage.

The GUI 94 depicted in FIG. 11 has a display element 92 titled "Insurance Assessment". The display element 92 displays the value that has been entered via the "Insurance Working" GUI that will be explained in more detail with reference to FIG. 15 below.

The automatic generation of an electronic insurance report requires the input of corresponding insurance related data for the particular event for which the new electronic dossier is created. By activating a control element in the form of the "Dates" tab for example of the "General" GUI 64 depicted in FIG. 7, a control signal is generated in response to which the "Dates" GUI 100 depicted in FIG. 13 and requesting the input of insurance related data is displayed.

Insurance related data are input via a plurality 102 of data fields including a data field requesting the incident date. The incident date is the date on which the incident, error or breach took place which gave rise to the event and the risk associated therewith. A further data field requests the date of discovery of the incident. This data field is of high importance in connection with automatic insurance reporting because the insurance usually must be notified within a specific term after the date of discovery of the incident. By means of an automated electronic insurance report that is initiated immediately after a new electronic dossier has been created, late notification can be prevented. The further data fields 102 of the GUI 100 depicted in FIG. 13 include a data field for the input of the date of demand (i.e. the date on which an opposite party makes a formal demand for compensation).

The application is configured such that for a particular event an insurance report is automatically generated if the event as entered in the electronic dossier satisfies specific conditions. These conditions may include for example that the initial amount claimed and/or the expected cost is higher than a predefined amount and/or that the event includes a personal claim against a member of the company. If at least one of these requirements is met, the event is automatically notified to the insurance by means of an electronic insurance report. This means that the person handling the event does not have to care whether the event is actually covered by any insurance program.

If after evaluation of an electronic insurance report the responsible authority comes to the conclusion that the reported event is not relevant for insurance purposes, this event will be deleted from the list of events for which further updates have to be reported. In such a case the option "No" has to be selected in the data field "Insurance Claim" 81 in the "Specific" GUI 80 depicted in FIG. 8. If, however, the event becomes an insurance issue, the option "Yes" has to be selected. In this case an update of the insurance related data will be requested on a regular basis in line with a specific risk report update process. In such a case an updated electronic insurance report is automatically generated based on the information entered during updating of risk related data.

In FIGS. 14 and 15 two optional GUIs 103, 105 are shown which enable the collection of insurance related data. The GUIs 103, 105 can be accessed via optional tabs titled "Insurance Working" and "Insurance Details". The GUIs 103, 150 include a plurality of data fields for entering standardized and non-standardized insurance related information. For example GUI 105 includes a data field 107 relating to an insurance assessment. The selected option will be displayed by display element 92 of GUI 94 depicted in FIG. 11. The GUI 105 further comprises a control element 109 in the form a hyperlink to an applicable insurance policy. Since the individual data fields of the GUIs 103, 105 are self-explaining, a more detailed description is omitted here.

Figure 16:
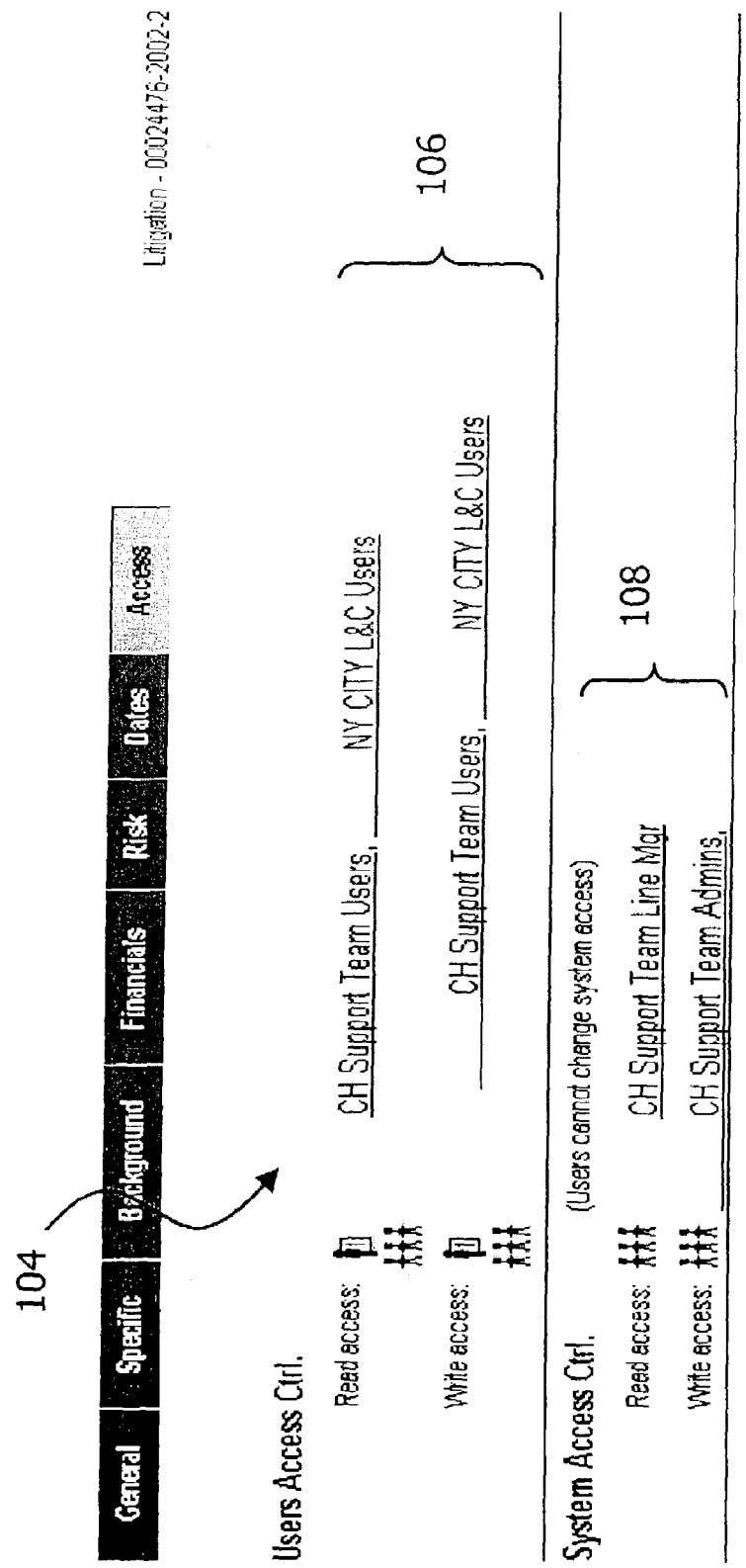
FIG. 16 is a schematic depiction of GUIs of the invention for inputting data relating to an access control.

As has been mentioned earlier, access control is an important feature of the invention. One aspect of access control relates to the individual definition of users that are allowed to access a particular electronic dossier. To that end a control element in the form of the "Access" tab is provided for example in the "General" GUI 64 of FIG. 7. By activating the "Access" tab of the "General" GUI 64, the GUI 104 depicted in FIG. 16 is displayed. The GUI 104 requests the input of access control data. The data fields 106 of the GUI 104 allow to create lists of users or user groups who are allowed to read (read access) and/or modify (write access) the particular electronic dossier. There exist two data fields 108 that cannot be modified by the person who creates the electronic dossier. These data fields 108 are titled "System Read Access" and "System Write Access". The users or user groups listed in the data fields 108 automatically have read or write access to the particular electronic dossier. The data fields 108 are provided for information purposes.

As soon as all relevant data characterizing a specific event have been included in a new electronic dossier or updated in an existing electronic dossier, the relevant data have to be included in an electronic report for this electronic dossier. In order to create such a report, a control element in the form of a "Reports" tab of the initial GUI 60 depicted in FIG. 6 has to be activated. In the view of FIG. 6 the "Reports" tab is hidden behind the "General" GUI 64.

Figure 17:
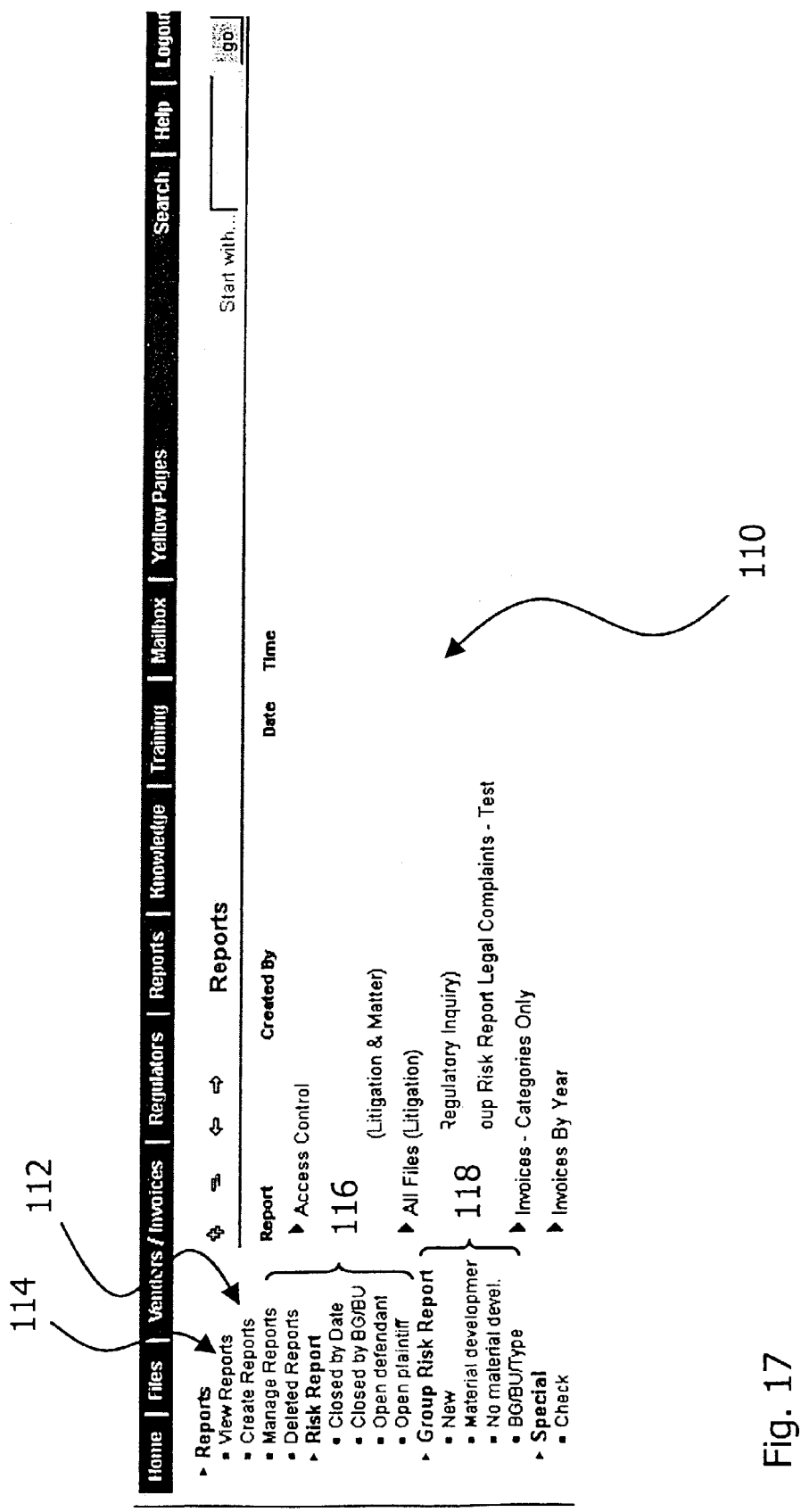
FIGS. 17 and 18 are schematical depictions of GUIs of the invention for generating risk reports.

When activating the "Reports" tab the GUI 110 depicted in FIG. 17 is generated. The GUI 110 depicted in FIG. 17 comprises a control element 112 titled "Create Reports". By clicking on this control element 112 automatically all information which is required for the reporting process is saved in a (risk) report for a particular newly created or updated electronic dossier as per a specific date. Such a report can thus be considered as a snap shot of the information of a specific electronic dossier on a specific date. Before the report is saved and released for the risk reporting process, it is necessary to check whether the information contained in the report is accurate. Changes cannot be made in the report itself but only in the electronic dossier via the corresponding tabs of the particular GUIs.

Once generated, the risk reports are saved as HTML documents in an appropriate database (FIG. 4). By activating the control element 114 titled "View Reports" of the GUI 110 depicted in FIG. 15, the risk report of any electronic dossier for which a user has access rights may be retrieved from the corresponding database and displayed by the browser.

When an electronic risk report for a specific electronic dossier is saved, the information contained in the electronic dossier is automatically evaluated with respect to the criteria discussed above to determine whether or not an electronic insurance notification is required. Should an electronic insurance notification be required, an electronic insurance report for the particular electronic dossier is automatically generated and transmitted by a communications network to an authority in charge of processing the electronic insurance report.

The GUI 110 depicted in FIG. 17 has a plurality 116 of further control elements (links) which allow to manage risk reports, to view deleted risk reports, and to view risk reports by "Closed by Date", "Closed by business group/business unit", by "Open defendant" or by "Open plaintiff". Furthermore, a plurality 118 of further control elements is provided which can be activated to generate control signals triggering the generation and display of a group risk report with respect to all electronic dossiers available in a specific database. Due to the use of standardized risk related data the generation of the group risk report is greatly facilitated. Possible options include the generation and display of a group risk report relating to new electronic dossiers, electronic dossiers subject to a material development, electronic dossiers subject to no material development and electronic dossiers relating to a particular business group or business unit.

For example by activating the control element titled "New" of the plurality 118 of control elements, a control signal is generated which causes the creation of an electronic risk report relating to newly created electronic dossiers that have been selected to be incorporated in the group risk report.

Figure 18:
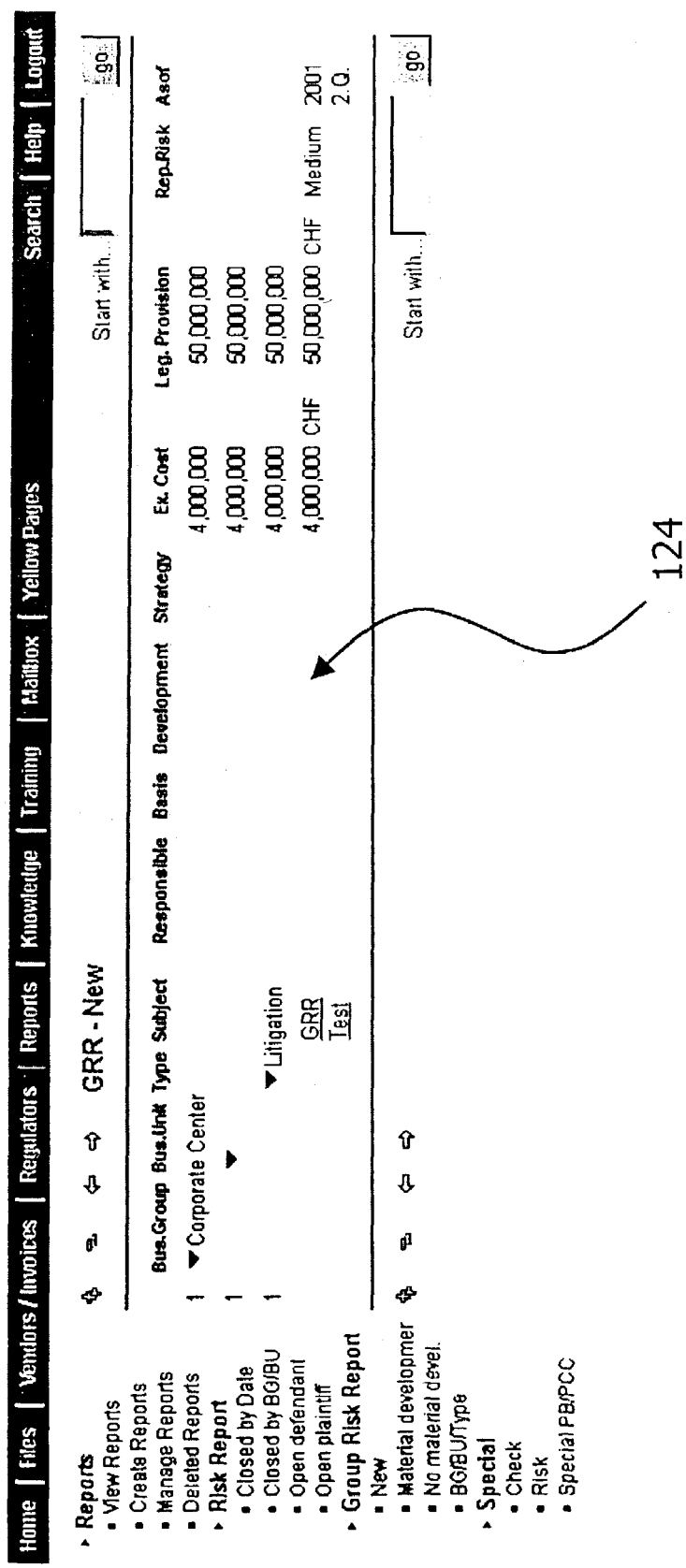

In FIG. 18 a GUI 124 in a form of an electronic group risk report for newly created electronic dossiers is shown. As becomes apparent from FIG. 18, the group risk report includes for every event which is part of the group risk report a plurality of data including the business group, the business unit, the type, the subject, the responsible, the reputational risk associated with the event, etc. The exemplary electronic risk report depicted in FIG. 18 includes only a single event. However, if a plurality of events had been classified "GRR new", the corresponding group risk report would list several events.

Figure 19:
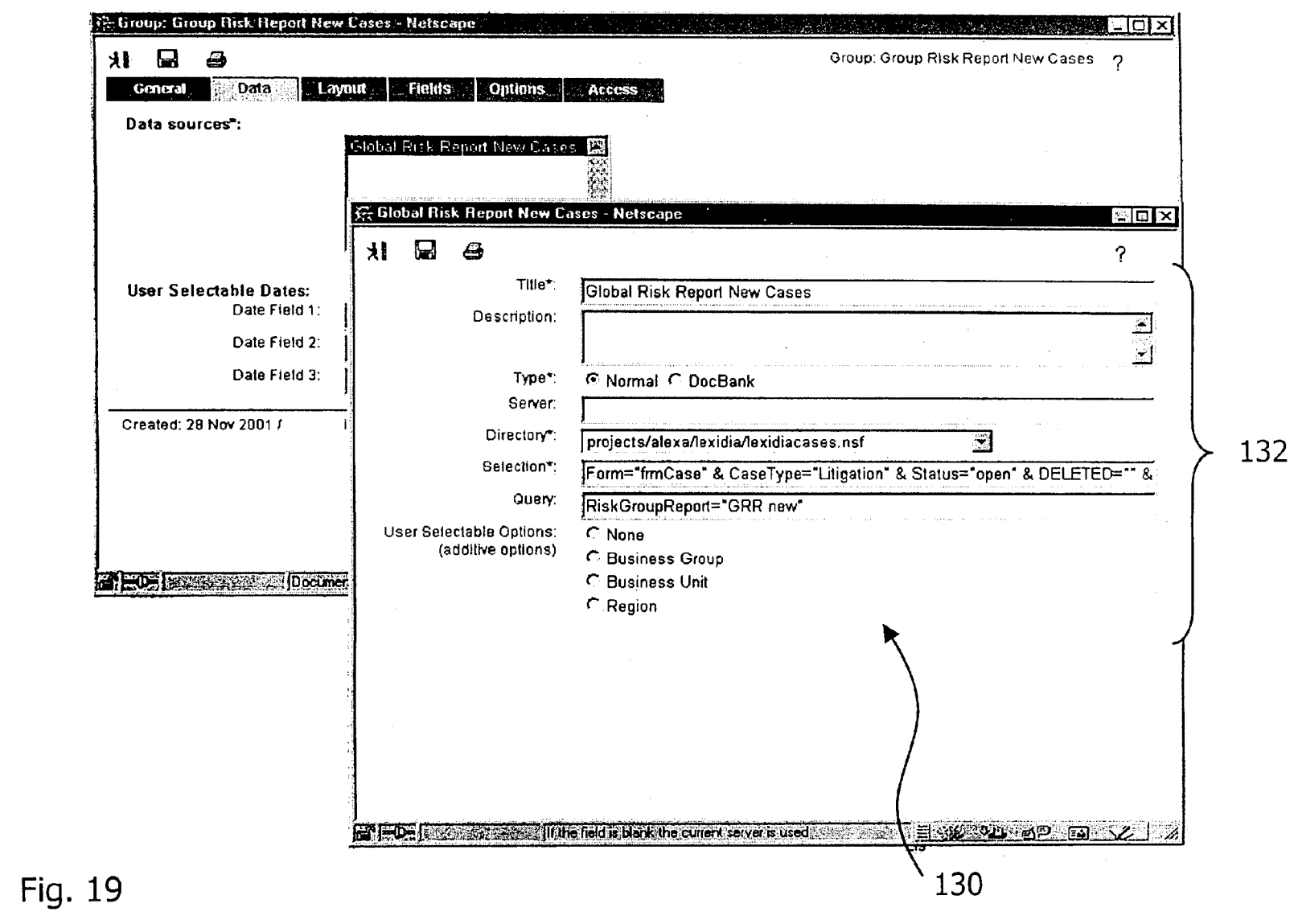

In order to enable an authorized user to generate a risk report containing individually specified data, an authorized user may himself define a specific report format by inputting appropriate report format data. FIG. 19 shows a corresponding GUI 130 requesting the input of report format data to be processed by the report generation processor when generating a specific electronic risk report. The GUI 130 enables a user to create a report format by selecting via a plurality of data fields 132 the information to be accumulated in the user-defined risk report.

Figure 20:
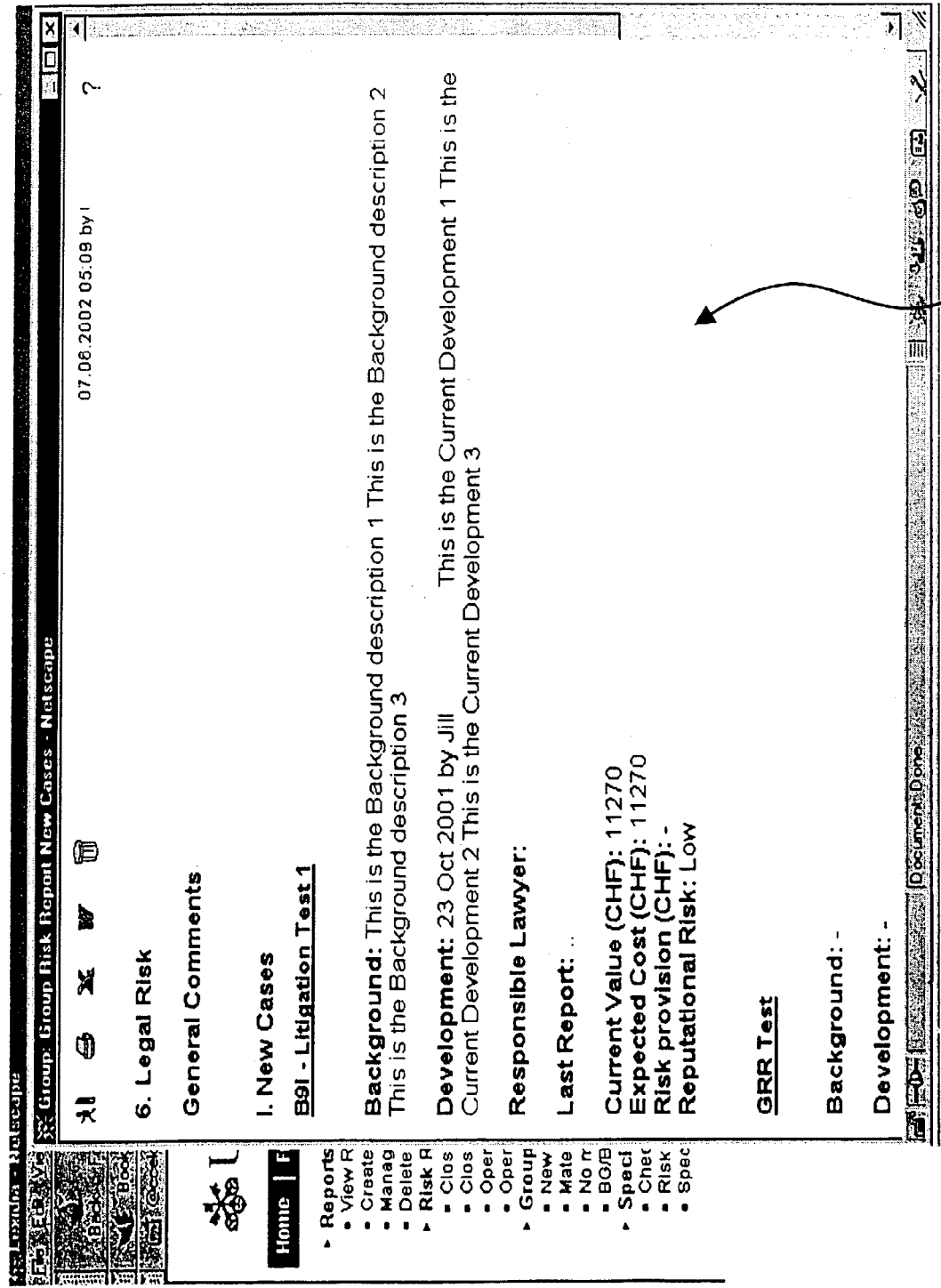
FIG. 20 schematically shows a risk report according to the invention.

In FIG. 20 an exemplary, user-defined electronic risk report in the form of an HTML document 140 displayed by the browser running on the user's client component is depicted. As becomes apparent from FIG. 20, the electronic risk report relates to all newly reported events that are subject to legal risk. For each event satisfying these requirements a plurality of information like background, development, responsible lawyer, etc. is reported. For each event included in the report relevant figures like the current value, the expected cost and risk provision is shown. Optionally, accumulated figures for all events included in the electronic risk report 140 could be included in the electronic risk report 140.

Alternative report formats could be used for example to create an electronic risk report containing all events handled by a specific internal responsible or external lawyer. Such risk reports help for example to distribute events subject to a high risk more evenly. In context with the generation of risk reports it should be noted that by implementing specific replication and access control mechanisms the content of a risk report generated by a specific user may be controlled.

The above-described embodiments of the invention are intended to be examples of the present invention and alterations and modifications may be effected thereto, by those of skill in the art, without departing from the scope of the invention which is defined thoroughly by the claims appended hereto.

The invention claimed is:

1. A network system serving at least two groups of network components (CC), the network system comprising:
    a first server unit (12) and a second server unit (14) each including a hosting unit (32), a database (20, 22) storing a plurality of electronic dossiers for the respective group of network components (CC), a report generation processor (34), and an access control list controller (30); and
    a replication unit (36) for establishing a replication connection (24) between the database (20) of the first server unit (12) and the database (22) of the second server unit (14), wherein the replication connection (24) is configured according to a one-way replication policy to replicate the electronic dossiers stored in the database (22) of the second server unit (14) into the database (20) of the first server unit and not vice versa;
    the hosting unit (32) of the first server unit (12) and the hosting unit of the second server unit (14) hosting, for respectively a first group of network components (CC) and a second group of network components (CC), the second group of network components (CC) being different from the first group of network components (CC), at least:
        a first program code portion for, when executed by one of the network components (CC), generating one or more graphical user interfaces GUIs, a first GUI (60) of said GUIs having at least a first control element (62) for one of creating and updating an electronic dossier of said electronic dossiers, the first control element (62) being adapted to be activated to generate a first control signal,
        a second program code portion responsive to generation of the first control signal to generate, when executed by one of the network components (CC), a request for the input of general data for a particular matter to be included in the electronic dossier of the particular matter, and
        a third program code portion responsive to generation of one of the first and a second control signal to generate, when executed by one of the network components (CC), a request for the input of standardized risk related data for the particular matter to be included in the electronic dossier of the particular matter,
    each report generation processor (34) having access to the database (20, 22) of its server unit (12, 14) for generating an electronic risk report by automatically processing the standardized risk related data included in one or more of the electronic dossiers,
    the access control list controller (ACL) of the first server unit (12) enforcing that users belonging to the second group of network components have no access to the electronic dossiers stored in the database (20) of the first server unit (12), and
    the access control list controller (ACL) of the second server unit (14) not containing any restrictions unless a user's access rights have individually been restricted.

2. The network system of claim 1, wherein the second server unit (14) is co-located with the first server unit (12).

3. The network system of claim 1, wherein the first server unit (12) serves the first group of network components (CC) via a first network (16) and the second server unit (14) serves the second group of network components (CC) via a second network (18) which is different from the first network (16).

4. The network system of claim 1, wherein at least the first server unit (12, 14) is an HTTP server.

5. The network system of claim 1, wherein the first server unit (12) and the second server unit (14) server units are physically separated from each other.

6. The network system of claim 1, wherein the first group of network components and the second group of network components are located in two separate access areas that are geographically distinct from each other.

7. The network system of claim 1, wherein generation of the request for the input of standardized risk related data includes generation of at least one of a menu for selecting predefined risk classifications and a data field for inputting standard risk related figures.

8. The network system of claim 1, wherein the third program code portion is responsive to the second control signal, wherein one of the first GUI (60) and a second GUI (84) of said GUIs has a second control element (94) for one of creating and updating standardized risk related data to be included in an electronic dossier, said second control element (94) being adapted to be activated to generate the second control signal.

9. The network system of claim 8, wherein one of the first program code portion and a fourth program code portion is programmed to generate a third GUI (110) of said GUIs, the third GUI (110) having a third control element (112) for triggering the generation of the electronic risk report, said third control element (112) being adapted to be activated to generate a third control signal which causes the report generation processor (34, 44) to generate the electronic risk report.

10. The network system of claim 9, wherein one of the first program code portion and a fifth program code portion is programmed to generate a fourth GUI of said GUIs, the fourth GUI having a fourth control element for triggering definition of a report format, said fourth control element being adapted to be activated to generate a fourth control signal, wherein a sixth program code portion is responsive to generation of the fourth control signal to generate a request (130) for the input of report format data to be processed by the report generation processor (34, 44) when generating the electronic risk report.

11. The network system of claim 10, further comprising a seventh program code portion responsive to generation of one of the first control signal and a fifth control signal to generate a request (102) for the input of insurance related data to be included in the electronic dossier of a particular matter.

12. The network system of claim 11, wherein the report generation processor (34, 44) is configured to generate upon receipt of one of the third control signal and the sixth control signal an electronic liability report by automatically processing the insurance related data included in one or more of the electronic dossiers.

13. A method of controlling a network system serving at least two groups of network components (CC), the method comprising:

provided a first server unit (12) and a second server unit (14) each including a hosting unit (32), a database (20, 22) storing a plurality of electronic dossiers for the respective group of network components (CC), a report generation processor (34), and an access control list controller (30);

establishing a replication connection (24) between the database (20) of the first server unit (12) and the database (22) of the second server unit (14), wherein the replication connection (24) is configured according to a one-way replication policy to replicate the electronic dossiers stored in the database (22) of the second server unit (14) into the database (20) of the first server unit and not vice versa; and hosting by the hosting unit (32) of the first server unit (12) and the hosting unit of the second server unit (14) for respectively a first group of network components (CC) and a second group of network components (CC), the second group of network components (CC) being different from the first group of network components (CC), at least:

a first program code portion for, when executed by one of the network components (CC), generating one or more graphical user interfaces GUIs, a first GUI (60) of said GUIs having at least a first control element (62) for creating or updating an electronic dossier of said electronic dossiers, the first control element (62) being adapted to be activated to generate a first control signal, a second program code portion responsive to generation of the first control signal to generate, when executed by one of the network components (CC), a request for the input of general data for a particular matter to be included in the electronic dossier of the particular matter, and a third program code portion responsive to generation of the first or a second control signal to generate, when executed by one of the network components (CC), a request for the input of standardized risk related data for the particular matter to be included in the electronic dossier of the particular matter;

providing access for each report generation processor (34) to the database (20, 22) of its server unit (12, 14) for generating an electronic risk report by automatically processing the standardized risk related data included in one or more of the electronic dossiers; and enforcing, with the access control list controller (ACL) of the first server unit (12), that users belonging to the second group of network components have no access to the electronic dossiers stored in the database (20) of the first server unit (12), wherein the access control list controller (ACL) of the second server unit (14) contains no restrictions unless a user's access rights have individually been restricted.

14. The method of claim 13, wherein processing the standardized risk related data included in the plurality of electronic dossiers comprises accumulating standardized risk related data included in the plurality of electronic dossiers according to a predefined report profile.

15. The method of claim 13, wherein different access control lists are provided in relation to the first and second server units (12, 14).

16. A computer program product stored on a computer storage medium comprising program code for performing the steps of claim 13 when running on a computer system (10, CC).

* * * * *